US011906025B2

United States Patent
Okuda et al.

(10) Patent No.: US 11,906,025 B2
(45) Date of Patent: Feb. 20, 2024

(54) CONTROL APPARATUS FOR VEHICLE

(71) Applicant: TOYOTA JIDOSHA KABUSHIKI KAISHA, Toyota (JP)

(72) Inventors: Koichi Okuda, Toyota (JP); Masafumi Yamamoto, Nagakute (JP); Yoshito Sekiguchi, Kariya (JP); Yuuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/302,094

(22) Filed: Apr. 18, 2023

(65) Prior Publication Data

US 2023/0341036 A1 Oct. 26, 2023

(30) Foreign Application Priority Data

Apr. 21, 2022 (JP) .................. 2022-070421

(51) Int. Cl.
*B60W 30/165* (2020.01)
*F16H 45/02* (2006.01)

(52) U.S. Cl.
CPC ........... *F16H 45/02* (2013.01); *B60W 30/165* (2013.01)

(58) Field of Classification Search
CPC ......... B60W 30/14–17; B60W 2554/801–802; B60W 2710/021–026; B60W 10/024; B60W 10/026; B60W 10/0235; B60W 2510/0258; B60W 2510/025; B60W 2510/0241; B60W 30/18072; B60W 2510/0291; B60W 30/16–17; F16H 2059/467

See application file for complete search history.

(56) References Cited

U.S. PATENT DOCUMENTS

| 9,175,768 B2 * | 11/2015 | Jeong .................... F16H 61/143 |
| 2004/0229728 A1 * | 11/2004 | Oshima ................ F16H 61/143 |
| | | 477/176 |
| 2019/0248366 A1 * | 8/2019 | Mizuno .............. B60W 30/143 |

FOREIGN PATENT DOCUMENTS

JP   2007064255 A  *  3/2007
JP   2012-201133 A    10/2012

* cited by examiner

*Primary Examiner* — Ernesto A Suarez
*Assistant Examiner* — Lillian T Nguyen
(74) *Attorney, Agent, or Firm* — Oblon, McClelland, Maier & Neustadt, L.L.P.

(57) ABSTRACT

A control apparatus for a vehicle provided with a power source and a fluid transmission device that includes a lockup clutch. The control apparatus includes: (a) a follow-up-running control portion for controlling a follow-up running in which the vehicle automatically runs following a preceding vehicle with a predetermined inter-vehicle distance to the preceding vehicle; and (b) a lockup-clutch control portion for controlling the lockup clutch such that an operation state of the lockup clutch is placed in one of a released state, a slipping state or an engaged state. The lockup-clutch control portion is configured, during the follow-up running, to execute a fluid-temperature increase suppressing control for controlling the operation state of the lockup clutch in a manner that suppresses increase of a temperature of a working fluid which circulates in the fluid transmission device and which is used to switch the operation state of the lockup clutch.

10 Claims, 13 Drawing Sheets

CONTROL APPARATUS FOR VEHICLE

This application claims priority from Japanese Patent Application No. 2022-070421 filed on Apr. 21, 2022, the disclosure of which is herein incorporated by reference in its entirety.

FIELD OF THE INVENTION

The present invention relates to a control apparatus for controlling a follow-up running of a vehicle.

BACKGROUND OF THE INVENTION

There is well-known a control apparatus for controlling a follow-up running of a vehicle in which the vehicle automatically runs following a preceding vehicle with a predetermined inter-vehicle distance to the preceding vehicle from the vehicle. An example of such a control apparatus is disclosed in JP 2012-201133 A. In this Japanese Patent Application Publication, it is described that, when a rate of inflow of air into the vehicle becomes lower than a required rate, the inflow rate is intended to be increased by deviating a part of an introduction portion for introducing the air into the vehicle, from a separation zone which is formed on a rear side of the preceding vehicle and in which the inflow rate is reduced.

SUMMARY OF THE INVENTION

In the follow-up running, the preceding vehicle acts as a windshield, reducing a rate of flow of the air hitting the following vehicle and accordingly reducing a running resistance against the following vehicle. However, a cooling performance of a heat exchanger that uses the air is reduced. The reduction of the cooling performance could cause a risk of increase of temperature of an object that is to be cooled by the heat exchanger, for example, wherein the object is, for example, a working fluid which circulates in a fluid transmission device with a lockup clutch provided in a power transmission path between a power source and drive wheels and which is used to switch an operation state of the lockup clutch. An increase of the temperature of the working fluid could cause a risk of deterioration of the working fluid, for example. As disclosed in the above-identified Japanese Patent Application Publication, if a condition of the follow-up running is changed, for example, by increasing the inter-vehicle distance from the predetermined inter-vehicle distance so as to suppress reduction of the air inflow rate, the running resistance is likely to be increased although the reduction of the air inflow rate is likely to be suppressed.

The present invention was made in view of the background art described above. It is therefore an object of the present invention to provide a control apparatus for a vehicle, wherein the control apparatus is capable of appropriately maintaining a follow-up running and suppressing a temperature increase of a working fluid that could be caused by a reduction of a cooling performance of a heat exchanger.

The object indicated above is achieved according to the following aspects of the present invention.

According to a first aspect of the invention, there is provided a control apparatus for a vehicle that is provided with (i) a power source, (ii) drive wheels and (iii) a fluid transmission device which is disposed in a power transmission path between the power source and the drive wheels and which includes a lockup clutch. The control apparatus includes: (a) a follow-up-running control portion configured to control a follow-up running in which the vehicle automatically runs following a preceding vehicle with a predetermined inter-vehicle distance to the preceding vehicle from the vehicle; and (b) a lockup-clutch control portion configured to control the lockup clutch such that an operation state of the lockup clutch is placed in one of a released state, a slipping state or an engaged state. The lockup-clutch control portion is configured, during the follow-up running, to execute a fluid-temperature increase suppressing control for controlling the operation state of the lockup clutch in a manner that suppresses increase of a temperature of a working fluid which circulates in the fluid transmission device and which is used to switch the operation state of the lockup clutch.

According to a second aspect of the invention, in the control apparatus according to the first aspect of the invention, the fluid-temperature increase suppressing control is to be executed to switch the operation state of the lockup clutch, which is controlled to be placed in the released state or the slipping state in accordance with a predetermined relationship, to the engaged state.

According to a third aspect of the invention, in the control apparatus according to the first or second aspect of the invention, the fluid-temperature increase suppressing control is to be executed to switch the operation state of the lockup clutch, which is controlled to be placed in the released state in accordance with a predetermined relationship, to the engaged state, and to switch the operation state of the lockup clutch, which is controlled to be placed in the slipping state in accordance with the predetermined relationship, to the released state.

According to a fourth aspect of the invention, in the control apparatus according to any one of the first through third aspects of the invention, the lockup-clutch control portion is configured to determine a predetermined fluid temperature value such that the determined value is lower as a temperature of the working fluid is increased more easily, wherein the lockup-clutch control portion is configured, when determining that the temperature of the working fluid is not lower than the predetermined fluid temperature value, to execute the fluid-temperature increase suppressing control such that an amount of heat generated in the fluid transmission device is reduced.

According to a fifth aspect of the invention, in the control apparatus according to the fourth aspect of the invention, an easiness of increase of the temperature of the working fluid is changeable depending on an environment of an expected running route that is expected in future running of the vehicle, wherein the lockup-clutch control portion is configured to determine the predetermined fluid temperature value based on information related to the environment of the expected running route.

According to a sixth aspect of the invention, in the control apparatus according to the fifth aspect of the invention, the lockup-clutch control portion is configured to calculate a load applied to the vehicle expected in the future running, based on the information related to the environment of the expected running route, wherein the lockup-clutch control portion is configured to determine the predetermined fluid temperature value such that the determined value is lower as the calculated load is higher.

According to a seventh aspect of the invention, in the control apparatus according to any one of the fourth through sixth aspects of the invention, an easiness of increase of the temperature of the working fluid is changeable depending on an inter-vehicle distance to the preceding vehicle from the vehicle, wherein the lockup-clutch control portion is configured to determine the predetermined fluid temperature value such that the determined value is lower as the inter-vehicle distance is shorter.

According to an eighth aspect of the invention, in the control apparatus according to any one of the fourth through seventh aspects of the invention, an easiness of increase of the temperature of the working fluid is changeable depending on a projected area of the preceding vehicle, wherein the lockup-clutch control portion is configured to determine the predetermined fluid temperature value such that the determined value is lower as the projected area as seen from rear of the preceding vehicle is larger.

According to a ninth aspect of the invention, in the control apparatus according to any one of the fourth through eighth aspects of the invention, an easiness of increase of the temperature of the working fluid is changeable depending on a preceding vehicle width that is a width of the preceding vehicle as measured in a direction horizontal and perpendicular to a direction of running of the preceding vehicle, wherein the lockup-clutch control portion is configured to determine the predetermined fluid temperature value such that the determined value is lower as the preceding vehicle width is larger.

According to a tenth aspect of the invention, in the control apparatus according to any one of the fourth through ninth aspects of the invention, the lockup-clutch control portion is configured to initiate execution of the fluid-temperature increase suppressing control when determining that the temperature of the working fluid is not lower than the predetermined fluid temperature value, and to terminate the execution of the fluid-temperature increase suppressing control when determining that the temperature of the working fluid is not higher than a control-termination threshold value that is lower than the predetermined fluid temperature value.

According to an eleventh aspect of the invention, in the control apparatus according to any one of the first through tenth aspects of the invention, the follow-up-running control portion is configured to stop the follow-up running, when determining that change in a running performance of the vehicle caused by execution of the fluid-temperature increase suppressing control makes it difficult to execute the follow-up running.

According to a twelfth aspect of the invention, in the control apparatus according to the eleventh aspect of the invention, the follow-up-running control portion is configured, when determining that the change makes it difficult to execute the follow-up running, to stop the follow-up running after receiving instruction or consent from a driver of the vehicle.

According to a thirteenth aspect of the invention, in the control apparatus according to any one of the first through twelfth aspects of the invention, the lockup-clutch control portion is configured to inhibit execution of the fluid-temperature increase suppressing control, when detecting failure of the fluid transmission device and/or at least one device involved in control of the fluid transmission device.

According to a fourteenth aspect of the invention, in the control apparatus according to any one of the first through thirteenth aspects of the invention, the lockup-clutch control portion is configured to terminate execution of the fluid-temperature increase suppressing control, when the follow-up running is terminated during the execution of the fluid-temperature increase suppressing control.

In the control apparatus according to the first aspect of the invention, during the follow-up running in which the vehicle automatically runs following the preceding vehicle with the predetermined inter-vehicle distance to the preceding vehicle from the vehicle, the fluid-temperature increase suppressing control is executed to control the operation state of the lockup clutch in the manner that suppresses the increase of the temperature of the working fluid which circulates in the fluid transmission device and which is used to switch the operation state of the lockup clutch. Thus, an amount of heat generated in the fluid transmission device including the lockup clutch can be reduced, without changing the actual inter-vehicle distance from the predetermined inter-vehicle distance in the follow-up running. Therefore, it is possible to appropriately maintain the follow-up running and to suppress the temperature increase of the working fluid that could be caused by a reduction of a cooling performance of a heat exchanger.

In the control apparatus according to the second aspect of the invention, the fluid-temperature increase suppressing control is to be executed to switch the operation state of the lockup clutch, which is controlled to be placed in the released state or the slipping state in accordance with the predetermined relationship, to the engaged state. Thus, the amount of the heat generated in the fluid transmission device including the lockup clutch can be appropriately reduced.

In the control apparatus according to the third aspect of the invention, the fluid-temperature increase suppressing control is to be executed to switch the operation state of the lockup clutch, which is controlled to be placed in the released state in accordance with the predetermined relationship, to the engaged state, and to switch the operation state of the lockup clutch, which is controlled to be placed in the slipping state in accordance with the predetermined relationship, to the released state. Thus, the amount of the heat generated in the fluid transmission device including the lockup clutch can be appropriately reduced.

In the control apparatus according to the fourth aspect of the invention, the predetermined fluid temperature value is determined such that the determined value is lower as the temperature of the working fluid is increased more easily, and, when it is determined that the temperature of the working fluid is not lower than the predetermined fluid temperature value, the fluid-temperature increase suppressing control is executed such that the amount of the heat generated in the fluid transmission device is reduced. Thus, when the temperature of the working fluid is increased easily, the fluid-temperature increase suppressing control is executed in an early stage whereby the increase of the temperature of the working fluid is suppressed.

In the control apparatus according to the fifth aspect of the invention, the easiness of increase of the temperature of the working fluid is changeable depending on the environment of the expected running route that is expected in future running of the vehicle, and the predetermined fluid temperature value is determined based on the information related to the environment of the expected running route. Thus, when the temperature of the working fluid is increased easily due to the environment of the running route, the fluid-temperature increase suppressing control is executed in an early stage.

In the control apparatus according to the sixth aspect of the invention, the load applied to the vehicle expected in the future running is calculated based on the information related to the environment of the expected running route, and the predetermined fluid temperature value is determined such that the determined value is lower as the calculated load is higher. Thus, when the temperature of the working fluid is increased easily due to the high load applied to the vehicle, the fluid-temperature increase suppressing control is executed in an early stage.

In the control apparatus according to the seventh aspect of the invention, the easiness of increase of the temperature of the working fluid is changeable depending on the inter-vehicle distance to the preceding vehicle from the vehicle, and the predetermined fluid temperature value is determined such that the determined value is lower as the inter-vehicle distance is shorter. Thus, when a cooling performance by air is reduced due to the short inter-vehicle distance, the fluid-temperature increase suppressing control is executed in an early stage.

In the control apparatus according to the eighth aspect of the invention, the easiness of increase of the temperature of the working fluid is changeable depending on the projected area of the preceding vehicle, and the predetermined fluid temperature value is determined such that the determined value is lower as the projected area as seen from rear of the preceding vehicle is larger. Thus, when the cooling performance by air is reduced due to the large projected area, the fluid-temperature increase suppressing control is executed in an early stage.

In the control apparatus according to the ninth aspect of the invention, the easiness of increase of the temperature of the working fluid is changeable depending on the preceding vehicle width, and the predetermined fluid temperature value is determined such that the determined value is lower as the preceding vehicle width is larger. Thus, when the cooling performance by air is reduced due to the large width of the preceding vehicle, the fluid-temperature increase suppressing control is executed in an early stage.

In the control apparatus according to the tenth aspect of the invention, the execution of the fluid-temperature increase suppressing control is initiated when it is determined that the temperature of the working fluid is not lower than the predetermined fluid temperature value, and the execution of the fluid-temperature increase suppressing control is terminated when it is determined that the temperature of the working fluid is not higher than the control-termination threshold value that is lower than the predetermined fluid temperature value. Thus, it is possible to avoid hunting, namely, avoid the execution of the fluid-temperature increase suppressing control from being repeatedly initiated and terminated in a short period of time, and to cause the fluid-temperature increase suppressing control to be terminated after the increase of the temperature of the working fluid has been sufficiently suppressed.

In the control apparatus according to the eleventh aspect of the invention, the follow-up running is stopped, when it is determined that the change in the running performance of the vehicle caused by the execution of the fluid-temperature increase suppressing control makes it difficult to execute the follow-up running. Thus, it is possible to avoid the increase of the temperature of the working fluid due to the follow-up running.

In the control apparatus according to the twelfth aspect of the invention, when it is determined that the execution of the follow-up running becomes difficult, the follow-up running is stopped after the instruction or consent is received from the driver of the vehicle. Thus, it is possible to appropriately shift from the follow-up running in which the vehicle is caused to run automatically, to the running in which the vehicle is caused to run through operations made by the driver of the vehicle.

In the control apparatus according to the thirteenth aspect of the invention, the execution of the fluid-temperature increase suppressing control is inhibited when the failure of the fluid transmission device and/or at least one device involved in control of the fluid transmission device is detected. Thus, the fluid-temperature increase suppressing control is not executed when there is a risk that the operation state of the lockup clutch could not appropriately switched.

In the control apparatus according to the fourteenth aspect of the invention, the execution of the fluid-temperature increase suppressing control is terminated when the follow-up running is terminated during the execution of the fluid-temperature increase suppressing control. Thus, when the follow-up running is not being executed, the fluid-temperature increase suppressing control is not executed, so that it is possible to simplify controls of the vehicle as a whole. Further, when the follow-up running is not being executed, no restriction is imposed on the operation state of the lockup clutch irrespective of the increase of the temperature of the working fluid.

Figure 1:
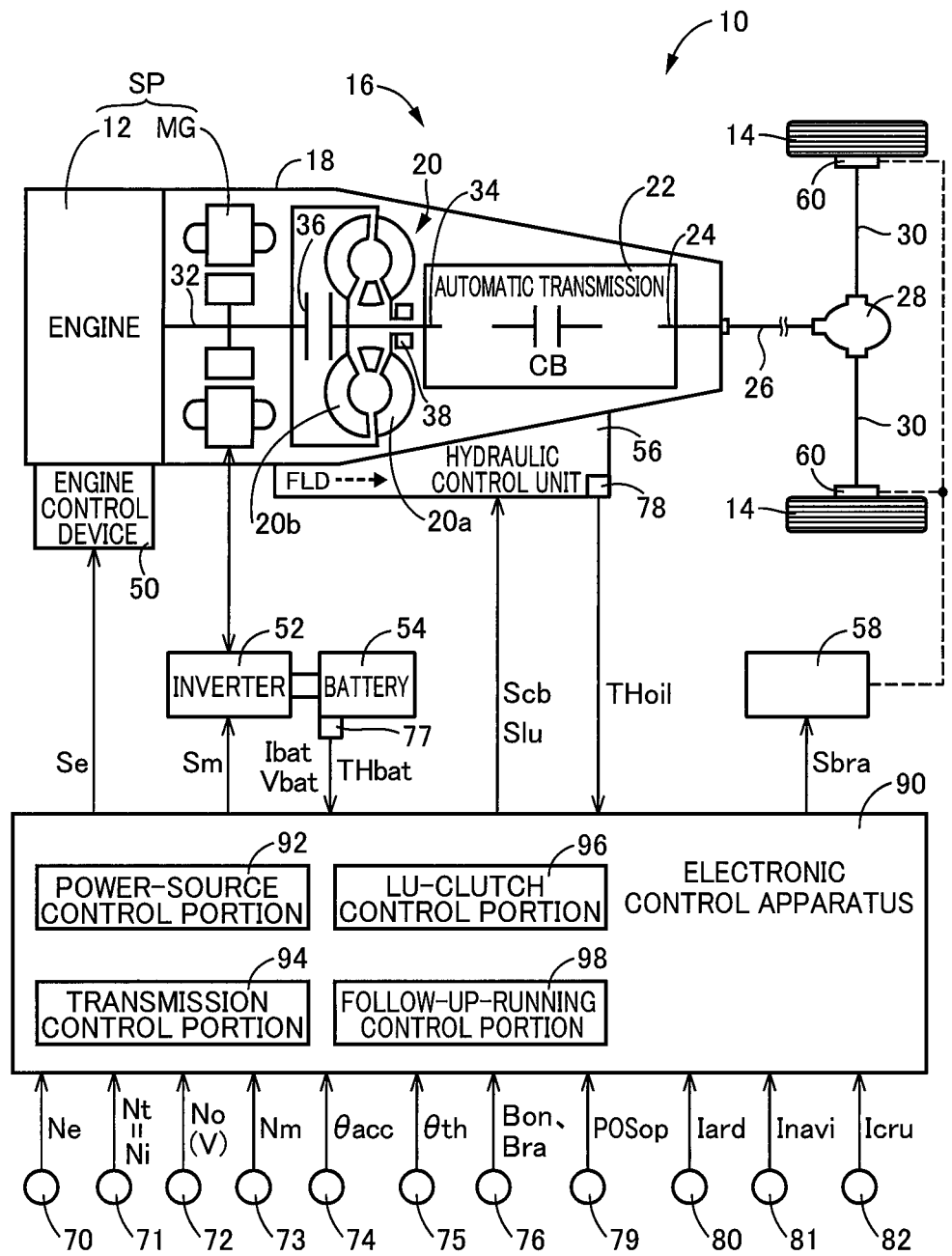
FIG. 1 is a view schematically showing a construction of a vehicle to which the present invention is to be applied, together with major portions of control functions and systems for executing various kinds of controls in the vehicle.

In embodiments of the present invention, a vehicle capable of executing the follow-up running is any one of various kinds of conventionally used vehicles such as an engine drive vehicle, an electric vehicle and a hybrid electric vehicle that is provided with a power source including an engine and a rotating machine. The engine is, for example, an internal combustion engine such as a gasoline engine and a diesel engine. The rotating machine is, for example, a motor generator that can be used selectively as an electric motor and a generator. The motor generator serves as the power source by being used as the electric motor, and is capable of generating a regenerative braking by being used as the generator. The rotating machine may be, for example, the electric motor that does not have function of the generator.

In the power transmission path between the fluid transmission device and the drive wheels, an automatic transmission may be provided. The automatic transmission may be a step variable transmission such as a planetary gear type transmission and a synchronous mesh twin shaft parallel axis-type transmission or a continuously variable transmission such as a belt-type transmission. A gear ratio of the automatic transmission is defined by "(rotational speed of input rotary member)/(rotational speed of output rotary member)". A high-side gear ratio of the automatic transmission as a high-vehicle-running-speed side gear ratio is lower than a low-side gear ratio of the automatic transmission as a low-vehicle-running-speed side gear ratio. For example, the lowest-side gear ratio is the lowest-vehicle-running-speed side gear ratio, and is the highest gear ratio in which the gear ratio is maximized.

Where the vehicle is provided with the automatic transmission, the working fluid is a transmission oil or fluid that is used in the automatic transmission. For example, the working fluid is an ATF (automatic transmission oil or fluid) used in the step variable transmission such as the planetary gear type transmission or a CVTF (continuously variable transmission oil or fluid) used in the continuously variable transmission such as the belt-type transmission.

Further, the follow-up running may be, for example, a manned running with a driver in the vehicle, or an unmanned running without a driver, for example, by an automatic steering system that enables the vehicle to run in accordance with a predetermined running route.

Further, the control apparatus executes a follow-up running control for controlling the follow-up running in which the vehicle runs following the preceding vehicle, by calculating a requested drive amount required to execute the follow-up running such that the inter-vehicle distance to the preceding vehicle from the own vehicle is maintained at a predetermined target inter-vehicle distance as the predetermined inter-vehicle distance, and by controlling an output of the power source such that the requested drive amount is obtained. In the follow-up running control, the output of the power source is controlled preferably together with control of a negative torque generated by an engine brake and a regenerative brake of the rotating machine. It is also possible to execute a brake force control through an automatic brake system.

Further, the vehicle capable of executing the follow-up running may be also a following vehicle in platooning. The platooning includes, for example, a leading vehicle and following vehicles automatically running in a line following the leading vehicle with the predetermined inter-vehicle distance between each adjacent vehicles, such that the vehicles forming the platooning are connected via a wireless communication so as to be controlled.

DETAILED DESCRIPTION OF PREFERRED EMBODIMENTS

There will be described embodiments of the present invention in details with reference to drawings.

First Embodiment

FIG. 1 is a view schematically showing a construction of a vehicle 10 to which the present invention is to be applied, together with major portions of control functions and systems for executing various kinds of controls in the vehicle 10. As shown in FIG. 1, the vehicle 10 is a hybrid electric vehicle including an engine 12 and a rotating machine MG that serve as a power source SP. The vehicle 10 further includes drive wheels 14 and a power transmission device 16 that is disposed in a power transmission path between the engine 12 and the drive wheels 14.

The engine 12 is a known internal combustion engine such as gasoline engine and diesel engine. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 12, is controlled.

The rotating machine MG is a rotating electric machine having a function serving as a motor configured to generate a mechanical power from an electric power and a function serving as a generator configured to generate an electric power from a mechanical power. That is, the rotating machine MG is a so-called "motor generator". The rotating machine MG is connected to a battery 54 provided in the vehicle 10, through an inverter 52 provided in the vehicle 10. The battery 54 serves as an electric storage device configured to supply and receive an electric power to and from the rotating machine MG. The inverter 52 is controlled by the electronic control apparatus 90 whereby an MG torque Tm as a torque of the rotating machine MG is controlled. The MG torque Tm serves as a power driving torque when acting as a positive torque for acceleration, with the rotating machine MG being rotated in a forward direction that is the same as a direction of rotation of the engine 12 during operation of the engine 12. The MG torque Tm serves as a regenerative torque when acting as a negative torque for deceleration, with the rotating machine MG being rotated in the forward direction. The electric power corresponds to an electric energy unless they are to be distinguished from each other. The power corresponds to a force or a torque unless they are to be distinguished from each other.

The power transmission device 16 includes a casing 18 as a non-rotary member that is attached to a body of the vehicle 10, a torque converter 20 connected to the engine 12, and an automatic transmission 22 which is connected to the torque converter 20 and which provided between the torque converter 20 and the drive wheels 14 in the power transmission path. The torque converter 20 and the automatic transmission 22 are disposed inside the casing 18. The power transmission device 16 further includes a propeller shaft 26 connected to a transmission output shaft 24 that is an output rotary member of the automatic transmission 22, a differential gear device 28 connected to the propeller shaft 26, and a pair of drive shafts 30 connected to the differential gear device 28. The power transmission device 16 still further includes a connection shaft 32 connecting between the engine 12 and the torque converter 20.

The rotating machine MG is connected to the connection shaft 32 in a power transmittable manner in the casing 18. The rotating machine MG is disposed in the power transmission path between the engine 12 and the drive wheels 14, so as to be connected to the engine 12 and the drive wheels 14 in a power transmittable manner, more specifically, the rotating machine MG is disposed in a power transmission path between the engine 12 and the torque converter 20, so as to be connected to the engine 12 and the torque converter 20 in a power transmittable manner. From another point of view, the rotating machine MG is connected to the torque converter 20 and the automatic transmission 22 in a power transmittable manner.

The torque converter 20 includes a pump impeller 20a connected to the connection shaft 32, and a turbine impeller 20b connected to a transmission input shaft 34 that is an input rotary member of the automatic transmission 22. The pump impeller 20a is an input member of the torque converter 20 while the turbine impeller 20b is an output member of the torque converter 20. The connection shaft 32 is also an input rotary member of the torque converter 20. The transmission input shaft 34 is also an output rotary member of the torque converter 20, which is formed integrally with a turbine shaft that is to be driven and rotated by the turbine impeller 20b. The torque converter 20 is a fluid transmission device which is provided in the power transmission path between the power source SP and the drive wheels 14 and which is configured to transmit a power of the power source SP from the connection shaft 32 to the transmission input shaft 34, through a fluid circulating in the torque converter 20. The fluid circulating in the torque converter 20 serves also as a working fluid that is used to switch an operation state (i.e., controlled state) of an LU clutch 36. This working fluid serves also a transmission oil that is used for executing shifting actions in the automatic transmission 22, for example. In the following description, this transmission oil will be referred to as "oil FLD".

The torque converter 20 includes the above-described LU clutch 36 configured to connect between the pump impeller 20a and the turbine impeller 20b, i.e., between the connection shaft 32 and the transmission input shaft 34. The LU clutch 36 is a known lockup clutch, i.e., a direct clutch configured to connect between the input and output rotary members of the torque converter 20.

The LU clutch 36 is a hydraulically-operated frictional engagement device constituted by a multiple-disc type or single-disc type clutch, for example. A controlled or operation state of the LU clutch 36 is to be switched among an engaged state, a slipping state and a released state, with an LU torque Tlu (that corresponds to a torque capacity of the LU clutch 36) being changed by an LU hydraulic pressure PRlu that is regulated and supplied by a hydraulic control unit (hydraulic control circuit) 56 provided in the vehicle 10.

As the operation state of the LU clutch 36, there are a released state (that may be referred also to as "fully released state") in which the LU clutch 36 is released, a slipped state in which the LU clutch 36 is engaged with slipping, and an engaged state (that may be referred also to as "fully engaged state") in which the LU clutch 36 is engaged. When the LU clutch 36 is placed in the released state, the torque converter 20 is placed in a torque converter state in which a torque boosting effect is obtained. When the LU clutch 36 is placed in the engaged state, i.e., is lock-up ON, the torque converter 20 is placed in a lockup state in which the pump impeller 20a and the turbine impeller 20b are rotated integrally with each other.

The automatic transmission 22 is a known automatic transmission of a planetary gear type which includes at least one planetary gear device (not shown) and an engagement device CB. The engagement device CB includes, for example, a plurality of hydraulically-operated frictional coupling devices each of which is configured to receive a CB hydraulic pressure PRcb that is a regulated hydraulic pressure supplied from the hydraulic control circuit 56, whereby a CB torque Tcb, i.e., torque capacity of each coupling device of the engagement device CB is changed and its controlled or operation state is switched among an engaged state, a slipping state and a released state, for example.

The automatic transmission 22 is a step-variable automatic transmission configured to establish a selected one of a plurality of gear positions, with a corresponding one or ones of the coupling devices of the engagement device CB being engaged, wherein the gear positions are different from each other in gear ratio (speed ratios) $\gamma$ (=AT input rotational speed Ni/AT output rotational speed No). The automatic transmission 22 is configured to switch from one of the gear positions to another one of the gear positions, namely, to establish one of the gear positions which is selected, by the electronic control apparatus 90, depending on, for example, an accelerating operation made by a vehicle driver (operator) and a running speed V of the vehicle 10. The AT input rotational speed Ni is a rotational speed of the transmission input shaft 34, and is an input rotational speed of the automatic transmission 22. The AT input rotational speed Ni is equal to a turbine rotational speed Nt that is an output rotational speed of the torque converter 20. Therefore, the AT input rotational speed Ni can be represented by the turbine rotational speed Nt. The AT output rotational speed No is a rotational speed of the transmission output shaft 24, and is an output rotational speed of the automatic transmission 22.

In the power transmission device 16, the power outputted from the power source SP is transmitted to the drive wheels 14 from the connection shaft 32 through sequentially the torque converter 20, automatic transmission 22, propeller shaft 26, differential gear device 28 and drive shafts 30, for example.

The vehicle 10 further includes an MOP 38 that is a mechanically-operated oil pump. The MOP 38 is connected to the pump impeller 20a, and is to be rotated and driven by the power source SP, so as to output a working fluid, i.e., an oil FLD that is to be used in the power transmission device 16. The working fluid OIL outputted by the MOP 38 is supplied to the hydraulic control circuit 56. The hydraulic control circuit 56, which receives the working fluid OIL as an original hydraulic pressure, supplies regulated hydraulic pressures that serve as the CB hydraulic pressure PRcb and the LU hydraulic pressure PRlu, for example.

The vehicle 10 is provided with a wheel brake device 58 that includes a brake master cylinder (not shown) configured to generate a brake hydraulic pressure and a cylinder actuator (not shown). The drive wheels 14 and driven wheels (not shown) are provided with respective wheel brakes 59. It is noted that the drive wheels 14 and other drive wheels (not shown) are provided with the respective wheel brakes 59 where the vehicle 10 is an all-wheel drive vehicle. The wheel brake device 58 is configured to control the wheel brakes 59 in accordance with commands supplied from the electronic control apparatus 90 such that a wheel brake torque, i.e., a brake torque is applied by each of the wheel brakes 59 is applied to a corresponding one of the wheels. The wheel brake device 58 supplies a brake hydraulic pressure to each of wheel cylinders (not shown) provided in the respective wheel brakes 59, for example, in response to a depressing operation of a brake pedal by the vehicle driver. In the wheel brake device 58, in a normal case, a master-cylinder hydraulic pressure generated by a brake master cylinder is supplied as the brake hydraulic pressure to the wheel cylinders, wherein a magnitude of the master-cylinder hydraulic pressure corresponds to a braking operation amount Bra. On the other hand, in the wheel brake device 58, in a particular case, for example, when a particular control is executed, the brake hydraulic pressure whose magnitude corresponds to a wheel brake torque required for execution of the particular control is supplied to the wheel cylinders, wherein the particular control includes an ABS control, a sideslip suppressing control, an automatic speed control, an automatic drive control, an automatic brake control and a regenerative control. The above-described braking operation amount Bra is a signal representing an amount of a braking operation, i.e., an amount of the depressing operation of the brake pedal, which corresponds to a depressing force applied to the brake pedal by the vehicle driver.

Figure 2:
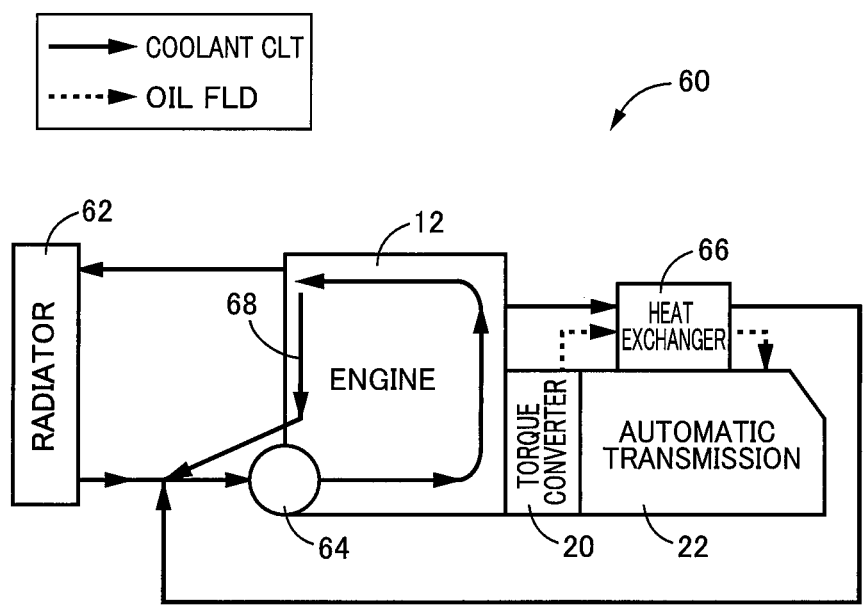
FIG. 2 is a view schematically showing a construction of a cooling system for cooling an oil.

FIG. 2 is a view schematically showing a construction of a cooling system 60 for cooling the oil FLD. As shown in FIG. 2, the cooling system 60 provided in the vehicle 10 includes a radiator 62, a water pump 64 and a heat exchanger 66. In FIG. 2, arrows of solid lines indicate flows of a coolant CLT, and arrows of broken lines indicate flows of the oil FLD.

The radiator 62 receives the coolant CLT flowing out from a water jacket of the engine 12 so as to cool the coolant CLT by exchanging heat with an outside air, and then discharges the cooled coolant CLT toward the water pump 64. The water pump 64, which is provided in the engine 12, for example, intakes the coolant CLT flowing out from the radiator 62, a bypass passage 68 of the water jacket of the engine 12 and the heat exchanger 66, and supplies the coolant CLT to the water jacket of the engine 12 so as to distribute the coolant CLT to various parts.

The heat exchanger 66 receives the coolant CLT flowing out from the water jacket of the engine 12 so as to cause the coolant CLT to circulate in the heat exchanger 66, and then causes the coolant CLT to flow out toward the water pump 64. Further, the heat exchanger 66 receives the oil FLD flowing out from the hydraulic control unit 56 and the torque converter 20 so as to cause the oil FLD to circulate in the heat exchanger 66, and then causes the oil FLD to flow out toward the hydraulic control unit 56. With the oil FLD and the coolant CLT being caused to circulate in the heat exchanger 66, the heat exchanger 66 exchanges heat between the oil FLD and the coolant CLT. In the heat exchanger 66, for example, when it is cold (during warming up), the heat is transferred from the coolant CLT heated by the engine 12 to the oil FLD, whereby the oil FLD is warmed up early. On the other hand, after warming up, the heat is transferred from the oil FLD warmed by the torque converter 20, for example, to the coolant CLT, whereby the oil FLD is cooled. Thus, the heat exchanger 66 is an oil cooler, i.e., a heat exchanger for oil, which is configured to exchange the heat between the oil FLD and the coolant CLT.

Referring back to FIG. 1, the vehicle 10 is provided with the electronic control apparatus 90 including a control apparatus for the vehicle 10. The electronic control apparatus 90 includes a so-called microcomputer incorporating a CPU, a ROM, a RAM and an input-output interface. The CPU performs various control operations of the vehicle 10, by processing various input signals, according to control programs stored in the ROM, while utilizing a temporary data storage function of the RAM. The electronic control apparatus 90 may be constituted by two or more control units exclusively assigned to perform respective different control operations such as an engine control operation, an electric-motor control operation, a clutch control operation and a transmission control operation, as needed.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a turbine speed sensor 71 indicative of a turbine rotational speed Nt that is equal to the AT input rotational speed Ni; an output signal of an output speed sensor 72 indicative of the AT output rotational speed No that corresponds to the running speed V of the vehicle 10; an output signal of a MG speed sensor 73 indicative of an MG rotational speed Nm which is a rotational speed of the rotating machine MG; an output signal of an accelerator-opening degree sensor 74 indicative of an acceleration opening degree θacc representing an amount of accelerating operation made by the vehicle driver; an output signal of a throttle-opening degree sensor 75 indicative of a throttle opening degree θth which is an opening degree of an electronic throttle valve; an output signal of a brake sensor 76 indicative of a brake-ON signal Bon representing a state of depression of a brake pedal by the vehicle driver to operate the wheel brakes 59 and also a braking operation amount Bra representing an amount of depression of the brake pedal by the vehicle driver corresponding to a depressing force applied to the brake pedal; an output signal of a battery sensor 77 indicative of a battery temperature THba which is a temperature of the battery 54, a charging/discharging electric current that and a voltage Vbat of the battery 54; an output signal of a fluid temperature sensor 78 indicative of an oil temperature THoil that is a temperature of the oil FLD in the hydraulic control unit 56; an output signal of a shift position sensor 79 indicative of an operation position POSsh of a shift lever provided in the vehicle 10; an output signal of a vehicle-area information sensor 80 indicative of vehicle area information Iard; an output signal of a navigation system 81 indicative of navigation information Inavi; and an output signals of an auto-cruise setting device 82 indicative of auto-cruise setting information Icru.

The vehicle-area information sensor 80 includes a lidar, a radar and and/or an onboard camera, for example, so as to directly obtain information relating to a road on which the vehicle 10 is running and information relating to an object or objects present around the vehicle 10. For example, the vehicle-area information sensor 80 is configured to detect objects present in the respective front, lateral and rear sides of the vehicle 10, and to output, as the vehicle area information Iard, object information that is information relating to the detected object or objects. The object information includes a distance and a direction of each of the detected objects from the vehicle 10. The vehicle area information lard includes: an inter-vehicle distance Dis from the vehicle 10 to a preceding vehicle, i.e., another vehicle running in front of the vehicle 10; a projected area Area as seen from rear of the preceding vehicle; and a preceding vehicle width that is a width of the preceding vehicle as measured in a direction horizontal and perpendicular to a direction of running of the preceding vehicle.

The navigation system 81 is a known navigation system including a display and a speaker, and is configured to specify a location of the vehicle 10 on pre-stored map data, based on the location information Ivp that is based on, for example, GPS signals (orbital signals) emitted by GPS (Global Positioning System) satellites. The navigation system 81 receives a destination point inputted thereto, calculates a running route from a departure point to the destination point, and informs, as instructions, the vehicle driver of the running route, for example, through the display and the speaker. The navigation information Inavi includes map information such as road information and facility information that are based on the map data pre-stored in the navigation system 81. In addition, the navigation information Inavi includes weather information, traffic information and the like, which are obtained by communication, for example.

The auto-cruise setting device 82 is a device that is to be operated to select an auto-cruise running for causing the vehicle 10 to run at a constant running speed and to perform a follow-up running. The auto-cruise running is a kind of automatic drive control for automatically controlling the power source SP so as to cause the vehicle 10 to run in a predetermined target running state without requiring an acceleration/deceleration operation by the vehicle driver. That is, in the present embodiment, the vehicle 10 can be driven with execution of the auto-cruise running in which the power source SP is automatically controlled depending on, for example, a target running speed Vt of the vehicle 10, in addition to being manually driven with the power source SP being controlled in accordance with the acceleration/deceleration operation of an acceleration pedal, for example, by the vehicle driver. The auto-cruise setting device 82 is a device for not only selecting the auto-cruise running but also setting or changing the target running speed Vt and a target inter-vehicle distance Dt in the follow-up running in which the vehicle 10 runs following a preceding vehicle. The auto-cruise setting device 82 is provided in a steering wheel, for example, and is configured to supply the auto-cruise information Icru containing the target running speed Vt and the target inter-vehicle distance Dt.

The electronic control apparatus 90 generates various output signals to the various devices provided in the vehicle 10, such as: an engine control command signal Se that is to be supplied to the engine control device 50 for controlling the engine 12; an MG control command signal Sm that is to be supplied to the inverter 52; a CB hydraulic control command signal Scb that is to be supplied to the hydraulic control unit 56 for controlling the engagement device CB; an LU hydraulic control command signal SLu that is to be supplied to the hydraulic control unit 56 for controlling the LU clutch 36; and a brake control command signal Sbra that is to be supplied to the wheel brake device 58 for controlling the wheel brake torque generated by each of the wheel brakes 59.

For performing various control operations in the vehicle 10, the electronic control apparatus 90 includes a power-source control means in the form of a power-source control portion 92, a transmission control means in the form of a transmission control portion 94, an LU-clutch control means in the form of an LU-clutch control portion 96, and a follow-up-running control means in the form of a follow-up-running control portion 98.

The power-source control portion 92 is a hybrid control means in the form of a hybrid control portion configured to cause the ending 12 and the rotating machine MG to be cooperatively operated so as to execute a hybrid drive control, for example. The power-source control portion 92 calculates a requested drive amount of the vehicle 10 requested by the vehicle driver, by applying the accelerator opening degree θacc and the vehicle running speed V, for examples, to a requested drive amount map that represents a pre-stored relationship obtained by experimentation or determined by an appropriate design theory. The requested drive amount is a requested value of a drive amount that is to be outputted by the vehicle 10. The drive amount is, for example, a drive force Fr or a drive torque Tr to be applied to the drive wheels 14. The requested drive amount is, for example, a requested drive force Frdem or a requested drive torque Trdem to be applied to the drive wheels 14. The power-source control portion 92 outputs the engine control command signal Se for controlling the engine 12 and also the MG control command signal Sm for controlling the rotating machine MG, for example, for thereby obtaining torque of the power source SP required to realize the requested drive torque Trdem, by taking account of various factors such as a transmission loss, an auxiliary load and the gear ratio γ of the automatic transmission 22.

The power transmission device 16 may include a connection/disconnection clutch that is provided in a part of the power transmission path between the engine 12 and the drive wheels 14, wherein the part is between the engine 12 and the rotating machine MG, such that the connection/disconnection clutch is configured to selectively connect and disconnect between the engine 12 and the rotating machine MG so as to selectively allow and inhibit a power transmission therebetween. Where the connection/disconnection clutch is provided, the power-source control portion 92 can execute a BEV (Battery Electric Vehicle) running, i.e., a motor running using only the rotating machine MG as the power source SP in a state in which the engine 12 is being stopped with the connection/disconnection clutch being in a released state. For example, when the requested drive torque Trdem can be covered by only an output of the rotating machine MG, the power-source control portion 92 establishes a BEV (Battery Electric Vehicle) driving mode as a driving mode. The BEV driving mode is an electric driving mode enabling the BEV running (electric running). When the requested drive torque Trdem cannot be covered without using at least the output of the engine 12, the power-source control portion 92 establishes an HEV driving mode, i.e., an engine driving mode, as the driving mode. The HEV driving mode is a hybrid driving mode enabling a hybrid running (HEV running), i.e., an engine running using at least the engine 12 as the power source SP with the connection/disconnection clutch being placed in the engaged state. On the other hand, even when the requested drive torque Trdem can be covered by only the output of the rotating machine MG, the power-source control portion 92 establishes the HEV driving mode as the driving mode, for example, in a case in which the battery 54 is required to be charged or in a case in which the engine 12 or other parts of the power transmission device 16 is required to be warmed up.

The transmission control portion 94 determines whether a shifting action is to be executed in the automatic transmission 22, by using, for example, a shifting map that represents a predetermined relationship, and outputs the CB hydraulic control command signal Scb, as needed, which is supplied to the hydraulic control unit 56, for executing the shifting action in the automatic transmission 22, depending on the determination using the shifting map. In the shifting map, the predetermined relationship is represented by shifting lines in two-dimensional coordinates in which the vehicle running speed V and the requested drive torque Trdem as two variables are taken along respective two axes, wherein the shifting lines are used for the determination as to whether the shifting action is to be executed in the automatic transmission 22. In the shifting map, one of the two variables may be the AT output rotational speed No in place of the vehicle running speed V, and the other of the two variables may be any one of the requested drive force Frdem, accelerator opening degree θacc and throttle opening degree θth in place of the requested drive torque Trdem.

The LU-clutch control portion 96 is a lockup-clutch control means in the form of a lockup-clutch control portion that is configured to control the controlled or operation state of the LU clutch 36 so as to place the LU clutch 36 into one of the released state, slipping state and engaged state. Specifically described, the LU-clutch control portion 96 determines a control region by using, for example, a lockup region diagram that represents a predetermined relationship, and outputs the LU hydraulic control command signal Slu to the hydraulic control unit 56, for supplying, to the LU clutch 36, the LU hydraulic pressure PRlu that establishes the operation state corresponding to the determined control region.

Figure 3:
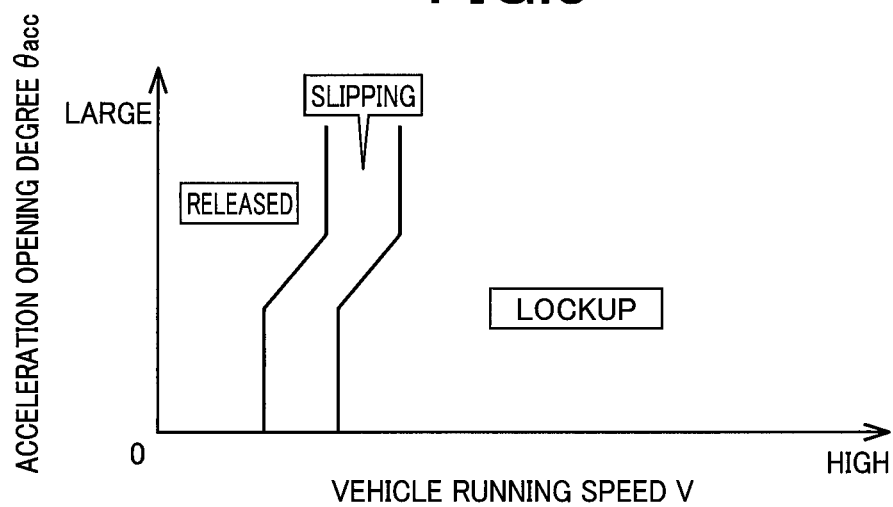
FIG. 3 is a view showing an example of a lockup region diagram used for controlling a lockup clutch.

FIG. 3 is a view showing an example of a lockup region diagram used for controlling the LU clutch 36. In the lockup region diagram, a predetermined relationship is represented by lines in two-dimensional coordinates in which the vehicle running speed V and the acceleration opening degree θacc as two variables are taken along respective two axes, wherein a released region corresponding to the released state, a slipping region corresponding to the slipping state and a lockup region corresponding to the engaged state are defined by the lines. In this lockup region diagram of FIG. 3, one of the two variables may be the AT output rotational speed No in place of the vehicle running speed V, and the other of the two variables may be the requested drive torque Trdem in place of the acceleration opening degree θacc.

When determining that the control region is in the lockup ON region, the LU-clutch control portion 96 sets the LU hydraulic pressure PRlu to a pressure value that provides the LU torque Tlu by which an LU input torque Tinlu (i.e., the input torque to the LU clutch 36) is transmittable through the LU clutch 36, and executes a lockup control for placing the LU clutch 36 into the fully engaged state. The LU input torque Tinlu corresponds to the engine torque Te, for example. The LU torque Tlu, by which the LU input torque Tinlu is transmittable through the LU clutch 36, is a torque value that is obtained, for example, by multiplying the LU input torque Tinlu by a safety factor (>1).

When the LU torque Tlu is small relative to the LU input torque Tinlu, slip occurs in the LU clutch 36. When determining that the control region is in the slipping region, the LU-clutch control portion 96 sets the LU hydraulic pressure PRlu to a pressure value that realizes a target LU slip amount Nslplut that is a target value of an LU slip amount Nslplu as the slip amount of the LU clutch 36 in presence of the LU input torque Tinlu, and executes an LU slip control as a slip control for establishing a target slipping state (that belongs to the above-described slipping state) of the LU clutch 36, which realize the target LU slip amount Nslplut. That is, the LU-clutch control portion 96 executes the LU slip control for controlling the LU clutch 36 so as to place the LU clutch 36 into the slipping state by setting the LU command pressure value Splu that realizes the target LU slip amount Nslplut. The LU slip amount Nslplu is a difference (=Ne−Nt) between the LU input rotational speed (=engine rotational speed Ne) and the LU output rotational speed (=turbine rotational speed Nt), wherein the difference is obtained by subtracting the LU output rotational speed from the LU input rotational speed. In the lockup region diagram of FIG. 3, the slipping region is located on a lower-running-speed side of the lockup ON region, and is a region in which execution of the lockup control is difficult and in which the slipping state is to be established for improving an energy efficiency and a drivability. Further, the slipping region is also a region that is set by taking account of the drivability and a booming noise or the like (e.g., NV performance against noise and vibration).

The follow-up-running control portion 98 is configured to execute a follow-up running as a kind of automatic drive control. The follow-up running is an autonomous driving of the vehicle 10 without requiring an acceleration/deceleration operation by the vehicle driver. The follow-up-running control portion 98 executes a follow-up running control for controlling the follow-up running in which the vehicle 10 runs keeping a target inter-vehicle distance Dt that is set by the auto-cruise setting device 82. In the follow-up running control, the follow-up-running control portion 98 controls the follow-up running in which the vehicle 10 automatically runs following a preceding vehicle with the target inter-vehicle distance Dt as a predetermined inter-vehicle distance to the preceding vehicle from the vehicle 10. That is, in the follow-up running control, the follow-up-running control portion 98 calculates the requested drive torque Trdem that is required to execute the follow-up running in a state in which the actual inter-vehicle distance Dis is substantially equal to the target inter-vehicle distance Dt, and controls the torque of the power source SP such that the calculated requested drive torque Trdem can be obtained. The target inter-vehicle distance Dt is set to a value dependent on, for example, the vehicle running speed V. The requested drive torque Trdem is obtained, for example, based on a difference between the target inter-vehicle distance Dt and the actual inter-vehicle distance Dis, through a feedback or feedforward control, for example. Further, when the requested drive torque Trdem is a negative (minus) value, for example, upon deceleration of the preceding vehicle, the follow-up-running control portion 98 causes an engine brake to be generated or a regenerative brake to be generated by the rotating machine MG, optionally together with a brake force generated by each of the wheel brakes 59 controlled by the wheel brake device 58, as needed, such that the negative requested drive torque Trdem is obtained. It is noted that, also during the follow-up running, the transmission control portion 94 switches the gear position established in the automatic transmission 22, as needed, in accordance with the above-described shifting map.

In the above-described follow-up running, the preceding vehicle acts as a windshield, reducing a rate of flow of the air hitting the vehicle 10 as the following vehicle and accordingly reducing a running resistance against the vehicle 10. However, a cooling performance of the radiator 62 is reduced and accordingly a cooling performance of the heat exchanger 66 is reduced in the cooling system 60. The reduction of the cooling performances could cause a risk of increase of the oil temperature THoil and accordingly deterioration of the oil FLD due to excessive increase of the oil temperature THoil. In a case in which the oil temperature THoil is increased during the follow-up running, it is preferable that the increase of the oil temperature THoil could be suppressed, for example, even without stopping the follow-up running, or without increasing the inter-vehicle distance Dis from the target inter-vehicle distance Dt.

To this end, during the follow-up running executed by the follow-up-running control portion 98, the LU-clutch control portion 96 executes a fluid-temperature increase suppressing control CTtho for controlling the operation state of the LU clutch 36, and changing the operation state as needed such that the increase of the oil temperature THoil is suppressed.

Among the released state, slipped state and engaged state as the operation state of the LU clutch 36, the amount of heat generated in the torque converter 20 is made smallest in the engaged state in which the LU slip amount Nslplu is made zero. Therefore, during the follow-up running, when the LU clutch 36 is controlled to be placed in the released state or the slipping state, the LU-clutch control portion 96 switches the operation state of the LU clutch 36 to the engaged state. During the follow-up running, when the LU clutch 36 is controlled to be placed in the engaged state, the LU-clutch control portion 96 maintains the engaged state. That is, the fluid-temperature increase suppressing control CTtho is executed to maintain the operation state of the LU clutch 36 that is controlled to be placed in the engaged state in accordance with the lockup region diagram (see FIG. 3), and to switch the operation state of the LU clutch 36 that is controlled to be placed in the released state or slipping state in accordance with the lockup region diagram, to the engaged state.

Specifically, first, the follow-up-running control portion 98 determines whether the follow-up running is being executed or not. When it is determined by the follow-up-running control portion 98 that the follow-up running is not being executed, the LU-clutch control portion 96 does not execute the fluid-temperature increase suppressing control CTtho. Therefore, the LU-clutch control portion 96 terminates the execution of the fluid-temperature increase suppressing control CTtho, namely, does not execute the fluid-temperature increase suppressing control CTtho, in a case in which the execution of the follow-up running is terminated by the follow-up-running control portion 98, namely, the follow-up running is not being executed by the follow-up-running control portion 98.

When it is determined by the follow-up-running control portion 98 that the follow-up running is being executed, the LU-clutch control portion 96 determines a fluid-temperature threshold value THf as a predetermined fluid temperature value that is a threshold value for determining whether the fluid-temperature increase suppressing control CTtho is to be executed or not. Then, the LU-clutch control portion 96 determines whether the oil temperature THoil is at least the fluid-temperature threshold value THf or not.

When determining that the oil temperature THoil is not lower than the fluid-temperature threshold value THf, the LU-clutch control portion 96 executes the fluid-temperature increase suppressing control CTtho so as to reduce the amount of heat generated in the torque converter 20. On the other hand, when determining that the oil temperature THoil is lower than the fluid-temperature threshold value THf, the LU-clutch control portion 96 does not execute the fluid-temperature increase suppressing control CTtho. Further, during execution of the fluid-temperature increase suppressing control CTtho, when determining that the oil temperature THoil is lower than the fluid-temperature threshold value THf, the LU-clutch control portion 96 terminates the execution of the fluid-temperature increase suppressing control CTtho and does not execute the fluid-temperature increase suppressing control CTtho.

When the vehicle 10 is in a condition that is likely to increase the oil temperature THoil, it is better to initiate the execution of the fluid-temperature increase suppressing control CTtho early. Therefore, the LU-clutch control portion 96 sets the fluid-temperature threshold value THf to a value lower as the oil temperature THoil is more likely to be increased.

Figure 4:
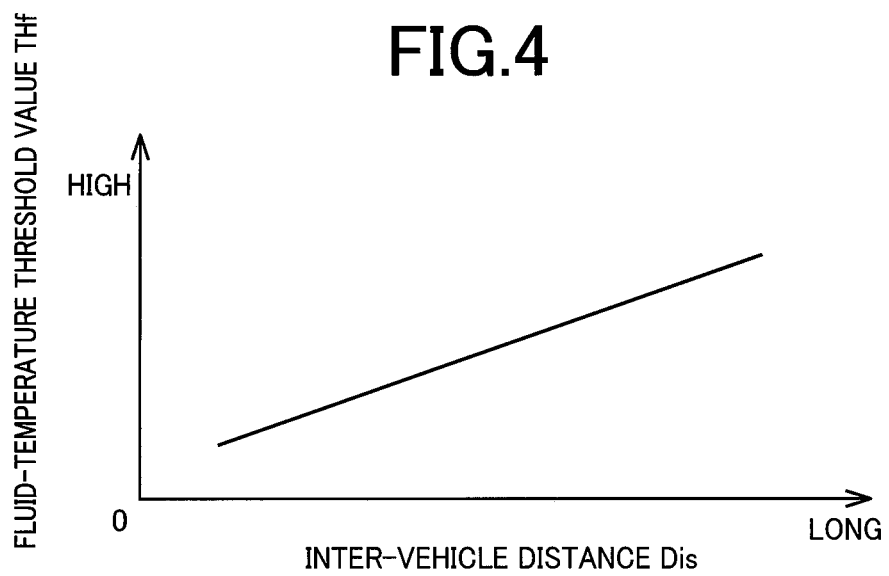
FIG. 4 is a view showing an example of a relationship used for determining a fluid-temperature threshold value, depending on an inter-vehicle distance to a preceding vehicle from the vehicle.

With increase of the inter-vehicle distance Dis to the preceding vehicle, the rate of flow of the air hitting the vehicle 10 is increased whereby the cooling performance of the cooling system 60 by the air is increased so that the oil temperature THoil is unlikely to be increased. In other words, with reduction of the inter-vehicle distance Dis to the preceding vehicle, the rate of flow of the air hitting the vehicle 10 is reduced whereby the cooling performance of the cooling system 60 by the air is reduced so that the oil temperature THoil is likely to be increased. Thus, easiness of increase of the oil temperature THoil varies depending on the inter-vehicle distance Dis to the preceding vehicle. Therefore, the LU-clutch control portion 96 sets the fluid-temperature threshold value THf to a value lower as the inter-vehicle distance Dis is shorter, for example, as shown in FIG. 4. FIG. 4 is a view showing an example of a relationship used for determining the fluid-temperature threshold value THf, depending on the inter-vehicle distance Dis.

Figure 5:
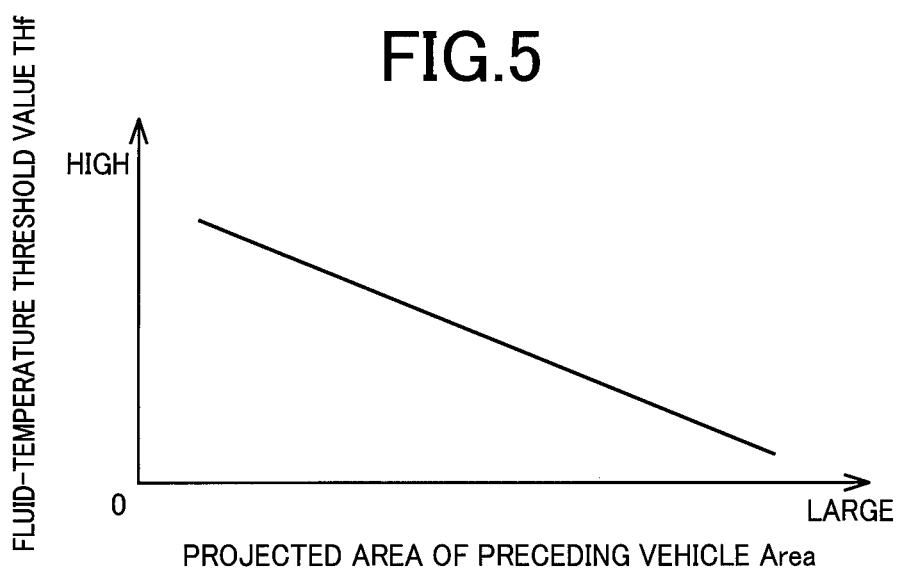
FIG. 5 is a view showing an example of a relationship used for determining the fluid-temperature threshold value, depending on a projected area of the preceding vehicle.

With increase of the projected area Area of the preceding vehicle, the rate of flow of the air hitting the vehicle 10 is reduced whereby the cooling performance of the cooling system 60 by the air is reduced so that the oil temperature THoil is likely to be increased. Thus, the easiness of increase of the oil temperature THoil varies depending on the projected area Area of the preceding vehicle. Therefore, the LU-clutch control portion 96 sets the fluid-temperature threshold value THf to a value lower as the projected area Area of the preceding vehicle is larger, for example, as shown in FIG. 5. FIG. 5 is a view showing an example of a relationship used for determining the fluid-temperature threshold value THf, depending on the projected area Area of the preceding vehicle.

Figure 6:
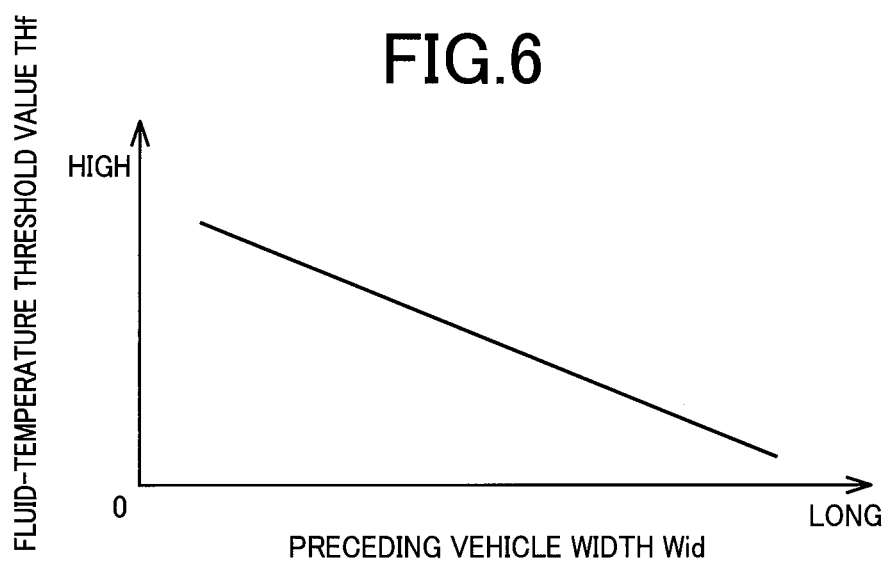
FIG. 6 is a view showing an example of a relationship used for determining the fluid-temperature threshold value, depending on a width of the preceding vehicle.

With increase of the preceding vehicle width Wid, the rate of flow of the air hitting the vehicle 10 is reduced whereby the cooling performance of the cooling system 60 by the air is reduced so that the oil temperature THoil is likely to be increased. Thus, the easiness of increase of the oil temperature THoil varies depending on the preceding vehicle width Wid. Therefore, the LU-clutch control portion 96 sets the fluid-temperature threshold value THf to a value lower as the preceding vehicle width Wid is larger, for example, as shown in FIG. 6. FIG. 6 is a view showing an example of a relationship used for determining the fluid-temperature threshold value THf, depending on the preceding vehicle width Wid.

Figure 7:
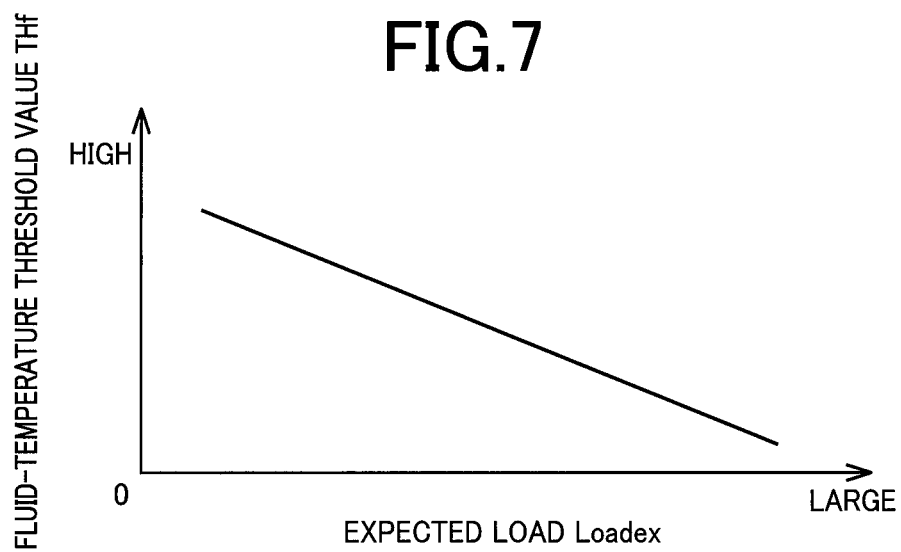
FIG. 7 is a view showing an example of a relationship used for determining the fluid-temperature threshold value, depending on an expected load.

The easiness of increase of the oil temperature THoil varies depending on an environment of an expected running route that is a running route expected in future running of the vehicle 10. For example, when the environment of the expected running route includes lots of uphill roads, and an expected load Loadex that is a vehicle load Load expected in the future running is likely to be large. The larger the expected load Loadex is, the larger the required drive torque Tr is, so that the LU clutch 36 is placed in the released state more frequently so as to place the torque converter 20 in a torque converter state in which a torque boosting effect is obtained. As more frequently the LU clutch 36 is placed in the released state, the oil temperature THoil is more likely to be increased. Thus, the easiness of increase of the oil temperature THoil varies depending on the expected load Loadex. Therefore, the LU-clutch control portion 96 obtains the road information of the navigation information Inavi as environment information that is information related to the environment of the expected running route, and calculates the expected load Loadex based on the road information of the expected running route. Then, the LU-clutch control portion 96 sets the fluid-temperature threshold value THf to a value lower as the expected load Loadex is larger, for example, as shown in FIG. 7. FIG. 7 is a view showing an example of a relationship used for determining the fluid-temperature threshold value THf, depending on the expected load Loadex.

As an outside temperature in the expected running route is higher, the oil temperature THoil is more likely to be increased. The LU-clutch control portion 96 obtains weather information of the navigation information Inavi as the environment information of the expected running route, and sets the fluid-temperature threshold value THf to a value lower as the outside temperature in the expected running route is higher.

When there is a heavy traffic in the expected running route, the oil temperature THoil is more likely to be increased. The LU-clutch control portion 96 obtains traffic information of the navigation information Inavi as the environment information of the expected running route, and sets the fluid-temperature threshold value THf to a value lower as the traffic in the expected running route is heavier.

Thus, the easiness of increase of the oil temperature THoil varies depending on the environment in the expected running route. The LU-clutch control portion 96 sets the fluid-temperature threshold value THf to a value dependent on the environment information of the expected running route.

When it is determined by the follow-up-running control portion 98 that the follow-up running is being executed, the LU-clutch control portion 96 obtains the vehicle area information Iard in the form of the inter-vehicle distance Dis to the preceding vehicle, the projected area Area of the preceding vehicle and the preceding vehicle width Wid of the preceding vehicle. Further, when it is determined by the follow-up-running control portion 98 that the follow-up running is being executed, the LU-clutch control portion 96 obtains the expected running route of the vehicle 10 from the navigation information Inavi, and then obtains the environment information of the expected running route.

The LU-clutch control portion 96 determines the fluid-temperature threshold value THf, depending on the vehicle area information Iard and the environment information of the expected running route. For example, the LU-clutch control portion 96 may set the fluid-temperature threshold value THf to a plurality of provisional values dependent on the vehicle area information Iard and the environment information of the expected running route, and may set the fluid-temperature threshold value THf to a definitive value that is the lowest one of the provisional values, so that the definitive value is used as the fluid-temperature threshold value THf for determining whether the fluid-temperature increase suppressing control CTtho is to be executed or not.

In the fluid-temperature increase suppressing control CTtho, in a case in which the LU clutch 36 controlled to be placed in the released state in accordance with the lockup region diagram, is switched to the engaged state, the torque boosting effect cannot be obtained in the torque converter 20. In this case, it could be difficult to obtain the requested drive torque Trdem required to execute the follow-up running, thereby causing a risk that the follow-up running could not be appropriately continued. In such a case, the follow-up-running control portion 98 determines whether the change of the running performance caused by the execution of the fluid-temperature increase suppressing control CTtho will make it difficult to execute the follow-up running, or not. When determining that the change of the running performance will make it difficult to execute the follow-up running, the follow-up-running control portion 98 stops the follow-up running and terminates the follow-up running.

Figure 8:
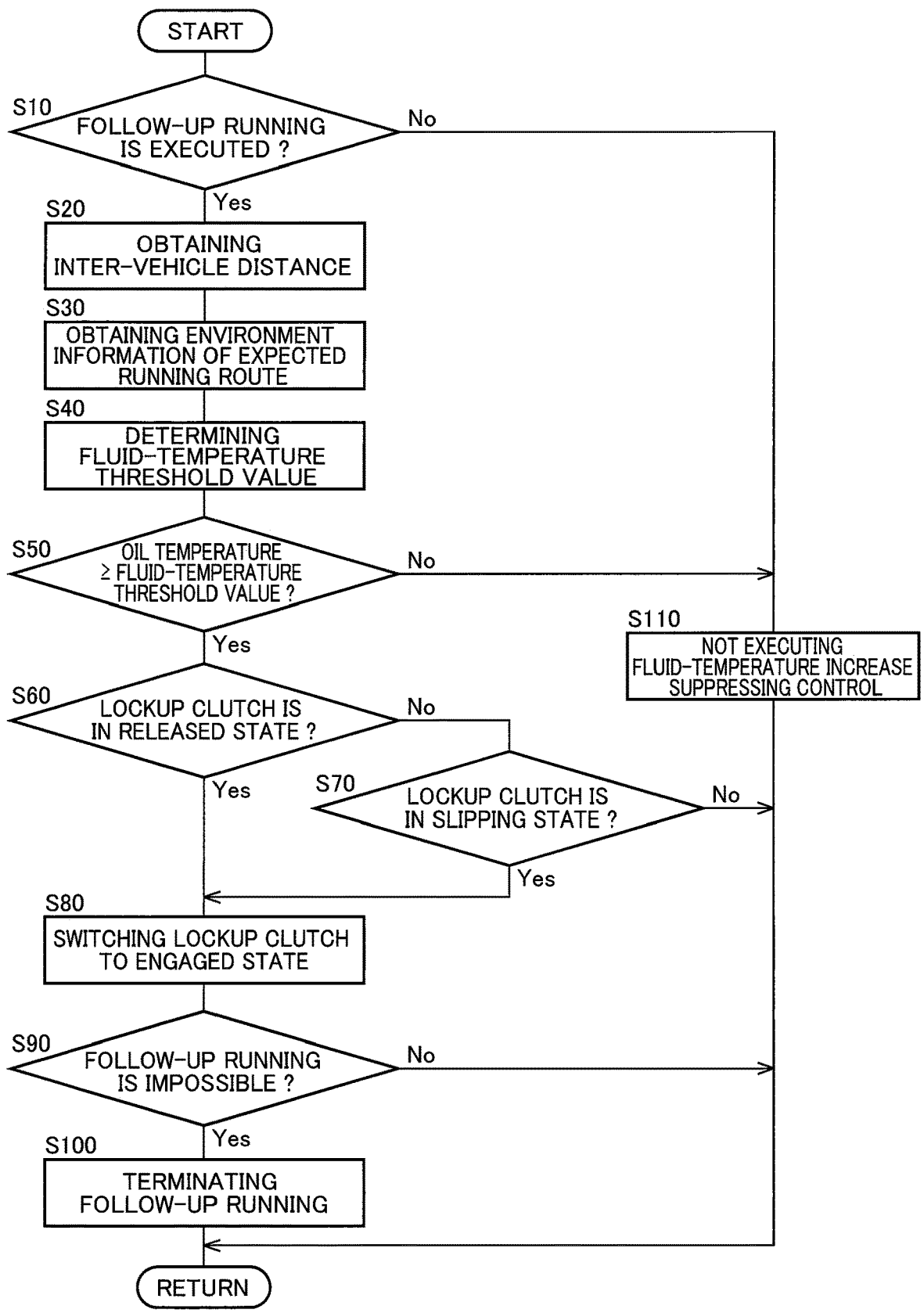
FIG. 8 is a flow chart showing of a control routine to be executed by an electronic control apparatus, so as to appropriately maintain a follow-up running and to suppress an increase of an oil temperature that could be caused by a reduction of a cooling performance of a heat exchanger.

FIG. 8 is a flow chart showing of a control routine to be executed by the electronic control apparatus 90, so as to appropriately maintain the follow-up running and to suppress the increase of the oil temperature THoil that could be caused by the reduction of the cooling performance of the heat exchanger 66. This control routine is executed, for example, in a repeated manner.

As shown in FIG. 8, the control routine is initiated with step S10 corresponding to function of the follow-up-running control portion 98, which is implemented to determine whether the follow-up running is being executed or not. When an affirmative determination is made at step S10, step S20 corresponding to function of the LU-clutch control portion 96 is implemented to obtain the vehicle area information Iard such as the inter-vehicle distance Dis to the preceding vehicle, the projected area Area of the preceding vehicle and the preceding vehicle width Wid of the preceding vehicle. Then, step S30 corresponding to function of the LU-clutch control portion 96 is implemented to obtain the environment information of the expected running route such as the road information, the weather information and the traffic information. Then, step S40 corresponding to function of the LU-clutch control portion 96 is implemented to determine the fluid-temperature threshold value THf, depending on the vehicle area information Iard and the environment information of the expected running route. Then, step S50 corresponding to function of the LU-clutch control portion 96 is implemented to determine whether the oil temperature THoil is at least the fluid-temperature threshold value THf or not. When an affirmative determination is made at step S50, step S60 corresponding to function of the LU-clutch control portion 96 is implemented to determine whether the operation state of the LU clutch 36 is the released state or not. When a negative determination is made at step S60, the control flow goes to step S70 corresponding to function of the LU-clutch control portion 96, which is implemented to determine whether the operation state of the LU clutch 36 is the slipping state or not. When a negative determination is made at step S70, one cycle of execution of the control routine is terminated. When an affirmative determination is made at step S60 or at step S70, the control flow goes to step S80 corresponding to function of the LU-clutch control portion 96, which is implemented to switch the operation state of the LU clutch 36 to the engaged state (lock-up ON). Then, step S90 corresponding to function of the follow-up-running control portion 98 is implemented to determine whether the execution of the follow-up running will be difficult or not, particularly, whether the execution of the follow-up running will be impossible or not. When a negative determination is made at step S90, one cycle of execution of the control routine is terminated. When an affirmative determination is made at step S90, step S100 corresponding to function of the follow-up-running control portion 98 is implemented to terminate the follow-up running. In a case in which a negative determination is made at step S10 or at step S50, the control flow goes to step S110 corresponding to function of the LU-clutch control portion 96 at which the fluid-temperature increase suppressing control CTtho is not executed.

As described above, in the present embodiment, during the follow-up running, the fluid-temperature increase suppressing control CTtho is executed to control the operation state of the LU clutch 36 in the manner that suppresses the increase of the oil temperature THoil. Thus, the amount of heat generated in the torque converter 20 including the LU clutch 36 can be reduced, without changing the actual inter-vehicle distance Dis from the target inter-vehicle distance Dt in the follow-up running. Therefore, it is possible to appropriately maintain the follow-up running and to suppress the increase of the oil temperature THoil that could be caused by the reduction of the cooling performance of the heat exchanger 66.

In the present embodiment, the fluid-temperature increase suppressing control CTtho is to be executed to switch the operation state of the LU clutch 36, which is controlled to be placed in the released state or the slipping state in accordance with the lockup region diagram, to the engaged state. Thus, the amount of the heat generated in the torque converter 20 including the LU clutch 36 can be appropriately reduced.

In the present embodiment, the fluid-temperature threshold value THf is determined such that the determined fluid-temperature threshold value THf is lower as the oil temperature THoil is increased more easily, and, when it is determined that the oil temperature THoil is not lower than the fluid-temperature threshold value THf, the fluid-temperature increase suppressing control CTtho is executed such that the amount of the heat generated in the torque converter 20 is reduced. Thus, when the oil temperature THoil is increased easily, the fluid-temperature increase suppressing control CTtho is executed in an early stage whereby the increase of the oil temperature THoil is suppressed.

In the present embodiment, the easiness of the increase of the oil temperature THoil is changeable depending on the environment of the expected running route, and the fluid-temperature threshold value THf is determined based on the environment information of the expected running route. Thus, when the oil temperature THoil is increased easily due to the environment of the expected running route, the fluid-temperature increase suppressing control CTtho is executed in an early stage.

In the present embodiment, the expected load Loadex is calculated based on the environment information of the expected running route, and the fluid-temperature threshold value THf is determined such that the determined fluid-temperature threshold value THf is lower as the expected load Loadex is higher. Thus, when the oil temperature THoil is increased easily due to the high expected load Loadex, the fluid-temperature increase suppressing control CTtho is executed in an early stage.

In the present embodiment, the easiness of increase of the oil temperature THoil is changeable depending on the inter-vehicle distance Dis to the preceding vehicle from the vehicle 10, and the fluid-temperature threshold value THf is determined such that the determined fluid-temperature threshold value THf is lower as the inter-vehicle distance Dis is shorter. Thus, when the cooling performance by the air is reduced due to the short inter-vehicle distance Dis, the fluid-temperature increase suppressing control CTtho is executed in an early stage.

In the present embodiment, the easiness of increase of the oil temperature THoil is changeable depending on the projected area Area of the preceding vehicle, and the fluid-temperature threshold value THf is determined such that the determined fluid-temperature threshold value THf is lower as the projected area Area as seen from rear of the preceding vehicle is larger. Thus, when the cooling performance by the air is reduced due to the large projected area Area, the fluid-temperature increase suppressing control CTtho is executed in an early stage.

In the present embodiment, the easiness of increase of the oil temperature THoil is changeable depending on the preceding vehicle width Wid, and the fluid-temperature threshold value THf is determined such that the determined fluid-temperature threshold value THf is lower as the preceding vehicle width Wid is larger. Thus, when the cooling performance by the air is reduced due to the large width Wid of the preceding vehicle, the fluid-temperature increase suppressing control CTtho is executed in an early stage.

In the present embodiment, the follow-up running is stopped, when it is determined that the change in the running performance of the vehicle 10 caused by the execution of the fluid-temperature increase suppressing control CTtho makes it difficult to execute the follow-up running. Thus, it is possible to avoid the increase of the oil temperature THoil due to the follow-up running.

In the present embodiment, the execution of the fluid-temperature increase suppressing control CTtho is terminated when the follow-up running is terminated during the execution of the fluid-temperature increase suppressing control CTtho. Thus, when the follow-up running is not being executed, the fluid-temperature increase suppressing control CTtho is not executed, so that it is possible to simplify controls of the vehicle 10 as a whole. Further, when the follow-up running is not being executed, no restriction is imposed on the operation state of the LU clutch 36 irrespective of the increase of the oil temperature THoil.

There will be described other embodiments of this invention. The same reference signs as used in the above-described embodiment will be used in the following embodiment, to identify the practically corresponding elements, and descriptions thereof are not provided.

Second Embodiment

In the above-described first embodiment, the same fluid-temperature threshold value THf is used to determine whether the fluid-temperature increase suppressing control CTtho is to be initiated or not and to determine whether the fluid-temperature increase suppressing control CTtho is to be terminated or not. In this second embodiment, different fluid-temperature threshold values THf are used for determination as to initiation of the fluid-temperature increase suppressing control CTtho and determination as to termination of the fluid-temperature increase suppressing control CTtho.

The LU-clutch control portion 96 sets a control-termination threshold value THfoff used for the determination as to the termination of the fluid-temperature increase suppressing control CTtho, to a value lower than a control-initiation threshold value THfon used for the determination as to initiation of the fluid-temperature increase suppressing control CTtho. The LU-clutch control portion 96 sets the control-initiation threshold value THfon, to the fluid-temperature threshold value THf that is determined in the above-described first embodiment, for example. Further, the LU-clutch control portion 96 sets the control-termination threshold value THfoff, to a value lower than the control-initiation threshold value THfon by a predetermined hunting suppression value.

When it is determined by the follow-up-running control portion 98 that the follow-up running is being executed, the LU-clutch control portion 96 determines the control-initiation threshold value THfon and the control-termination threshold value THfoff. Then, the LU-clutch control portion 96 determines whether the oil temperature THoil is at least the control-initiation threshold value THfon or not. When determining that the oil temperature THoil is at least the control-initiation threshold value THfon, the LU-clutch control portion 96 initiate execution of the fluid-temperature increase suppressing control CTtho. Further, when the fluid-temperature increase suppressing control CTtho is being executed, the LU-clutch control portion 96 determines whether the oil temperature THoil is the control-termination threshold value THfoff or less. When determining that the oil temperature THoil is the control-termination threshold value THfoff or less, the LU-clutch control portion 96 terminates the execution of the fluid-temperature increase suppressing control CTtho.

Figure 9:
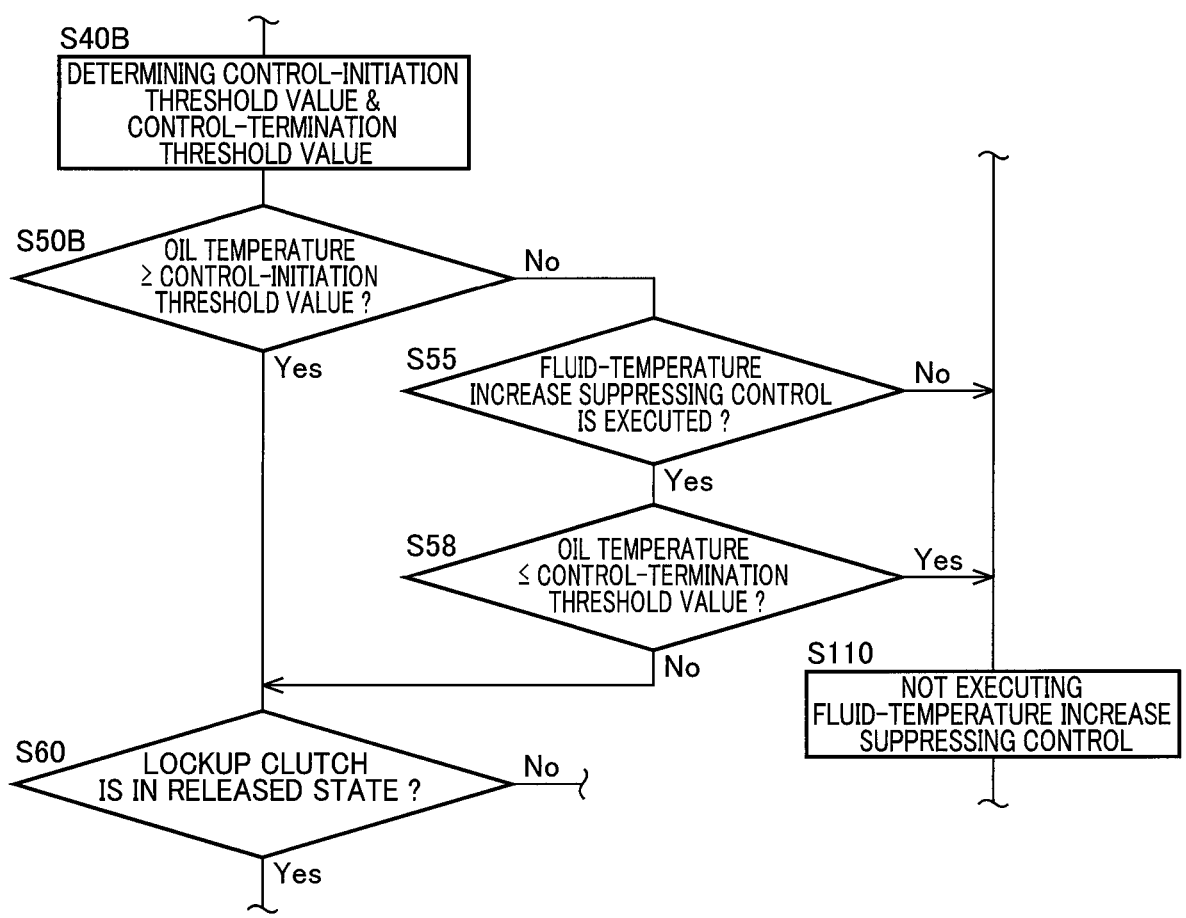
FIG. 9 is a flow chart showing of a control routine to be executed by the electronic control apparatus, so as to appropriately maintain the follow-up running and to suppress the increase of the oil temperature that could be caused by the reduction of the cooling performance of the heat exchanger, wherein this control routine is other than the control routine shown in the flow chart of FIG. 8.
Figure 10:
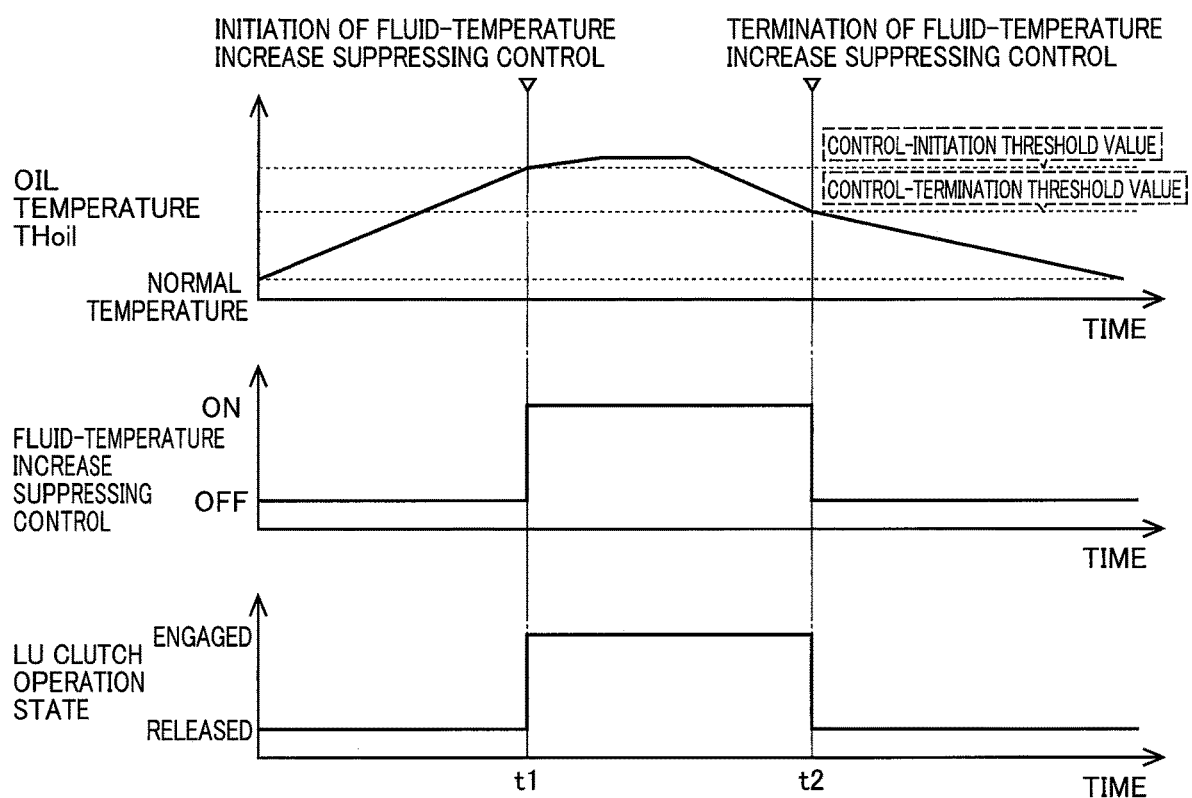
FIG. 10 is a view showing, by way of example, a time chart where the control routine shown in the flow chart of FIG. 9 is executed.

FIG. 9 is a flow chart showing of a control routine to be executed by the electronic control apparatus 90, so as to appropriately maintain the follow-up running and to suppress the increase of the oil temperature THoil that could be caused by the reduction of the cooling performance of the heat exchanger 66. This control routine is executed, for example, in a repeated manner, and is other than the control routine shown in the flow chart of FIG. 8. In the flow chart of FIG. 9, mainly, parts different from those of the control routine shown in the flow chart of FIG. 8 are described. FIG. 10 is a view showing, by way of example, a time chart where the control routine shown in the flow chart of FIG. 9 is executed.

In the control routine shown in FIG. 9, the above-described step S40 is replaced by step S40B corresponding to function of the LU-clutch control portion 96, which is implemented to determine the control-initiation threshold value THfon and the control-termination threshold value THfoff. Further, the above-described step S50 is replaced by step S50B corresponding to function of the LU-clutch control portion 96, which is implemented to determine whether the oil temperature THoil is at least the control-initiation threshold value THfon or not. When a negative determination is made at step 50B, the control flow goes to step S55 corresponding to function of the LU-clutch control portion 96 which is implemented to determine whether the fluid-temperature increase suppressing control CTtho is being executed or not. When an affirmative determination is made at step S55, step S58 corresponding to function of the LU-clutch control portion 96 is implemented to determine whether the oil temperature THoil is the control-termination threshold value THfoff or less. When a negative determination is made at step S55 or when an affirmative determination is made at step S58, the above-described sep S110 is implemented. When an affirmative determination is made at step S50B, or when a negative determination is made at step S58, the above-described step S60 is implemented.

FIG. 10 shows, by way of example, change of the oil temperature THoil during execution of the follow-up running. In FIG. 10, a time point t1 represents a point of time at which the oil temperature THoil becomes not lower than the control-initiation threshold value THfon, during execution of the follow-up running. As a result of this, the fluid-temperature increase suppressing control CTtho is placed on its ON state, namely, execution of the fluid-temperature increase suppressing control CTtho is initiated, and the operation state of the LU clutch 36 is switched from the released state to the engaged state (lock-up ON) (see time point t1 to time point 2). When the oil temperature THoil is reduced to be not higher than the control-termination threshold value THfoff by the execution of the fluid-temperature increase suppressing control CTtho, the fluid-temperature increase suppressing control CTtho is placed in its OFF state, namely, the fluid-temperature increase suppressing control CTtho is terminated whereby the operation state of the LU clutch 36 is switched to the released state (see time point t2 and thereafter). In the example shown in FIG. 10, the operation state of the LU clutch 36 is switched to the released state upon termination of the fluid-temperature increase suppressing control CTtho. However, after termination of the fluid-temperature increase suppressing control CTtho, the operation state of the LU clutch 36 does not necessarily have to be switched to the released state, as long as the operation state of the LU clutch 36 is returned to a normal control in which the operation state is controlled in accordance with the lockup region diagram (see FIG. 3).

As described above, in this second embodiment, the execution of the fluid-temperature increase suppressing control CTtho is initiated when it is determined that the oil temperature THoil is not lower than the control-initiation threshold value THfon, and the execution of the fluid-temperature increase suppressing control CTtho is terminated when it is determined that the oil temperature THoil is not higher than the control-termination threshold value THfoff that is lower than the control-initiation threshold value THfon. Thus, it is possible to avoid hunting, namely, avoid the execution of the fluid-temperature increase suppressing control CTtho from being repeatedly initiated and terminated in a short period of time, and to cause the fluid-temperature increase suppressing control CTtho to be terminated after the increase of the oil temperature THoil has been sufficiently suppressed.

Third Embodiment

In the above-described first embodiment, the fluid-temperature increase suppressing control CTtho is executed to switch the operation state of the LU clutch 36, which is controlled to be placed in the released state or the slipping state in accordance with the lockup region diagram (see FIG. 3), to the engaged state. The amount of heat generated in the torque converter 20 is made largest in the slipping state, and there is a case in which there is not much difference in the amount of the generated heat between the released state and the engaged state. In such a case, the LU clutch 36 controlled to be placed in the slipping state maybe placed in the released state in which the torque boosting effect can be obtained in the torque converter 20.

In this third embodiment, the LU-clutch control portion 96 switches the operation state of the LU clutch 36 to the released state, in a case in which the operation state of the LU clutch 36 is controlled to be placed in the slipping state during execution of the LU-clutch control portion 96. That is, the fluid-temperature increase suppressing control CTtho is configured to switch the operation state of the LU clutch 36 to the engaged state, when the operation state of the LU clutch 36 is controlled to be placed in the released state in accordance with the lockup region diagram, and is configured to switch the operation state of the LU clutch 36 to the released state, when the operation state of the LU clutch 36 is controlled to be placed in the slipping state in accordance with the lockup region diagram.

Figure 11:
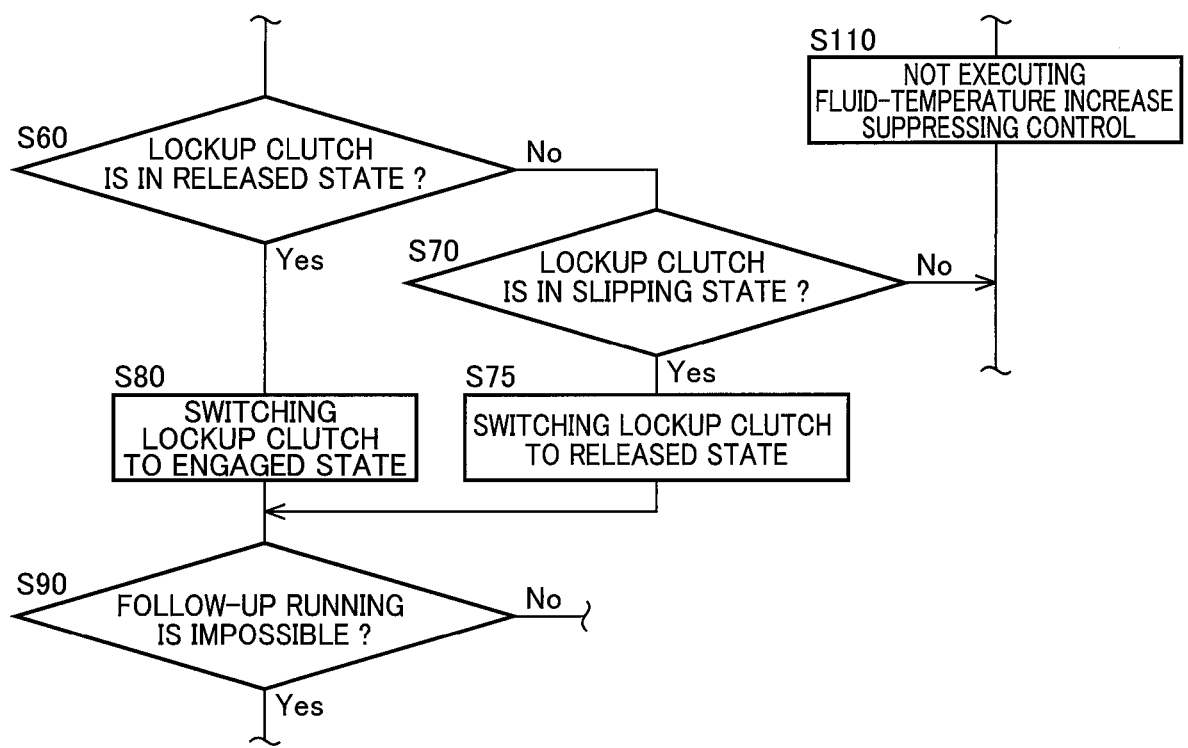
FIG. 11 is a flow chart showing of a control routine to be executed by the electronic control apparatus, so as to appropriately maintain the follow-up running and to suppress the increase of the oil temperature that could be caused by the reduction of the cooling performance of the heat exchanger, wherein this control routine is other than the control routine shown in the flow chart of FIG. 8.

FIG. 11 is a flow chart showing of a control routine to be executed by the electronic control apparatus 90, so as to appropriately maintain the follow-up running and to suppress the increase of the oil temperature THoil that could be caused by the reduction of the cooling performance of the heat exchanger 66. This control routine is executed, for example, in a repeated manner, and is other than the control routine shown in the flow chart of FIG. 8. In the flow chart of FIG. 11, mainly, parts different from those of the control routine shown in the flow chart of FIG. 8 are described.

In the control routine shown in the flow chart of FIG. 11, when a negative determination is made at the above-described step S60, the above-described step S70 is implemented. When an affirmative determination is made at step S70, step S75 corresponding to function of the LU-clutch control portion 96 is implemented to switch the operation state of the LU clutch 36 to the released state. When an affirmative determination is made at step S60, the above-described step S80 is implemented. The above-described step S90 is implemented after implementation of step S75 or step S80.

As described above, in this third embodiment, the fluid-temperature increase suppressing control CTtho is to be executed to switch the operation state of the LU clutch 36, which is controlled to be placed in the released state in accordance with the lockup region diagram, to the engaged state, and to switch the operation state of the LU clutch 36, which is controlled to be placed in the slipping state in accordance with the lockup region diagram, to the released state. Thus, the amount of the heat generated in the torque converter 20 including the LU clutch 36 can be appropriately reduced.

Fourth Embodiment

In the above-described first embodiment, when it is determined that the execution of the follow-up running is difficult, the follow-up running is stopped. In this instance, the stop of the follow-up running requires the driver to perform operations such as acceleration and deceleration. Therefore, in order to smoothly shift to driver operation, it is possible to ask the vehicle driver to confirm that follow-up running is to be stopped.

When determining that the execution of the follow-up running will be difficult, the follow-up-running control portion 98 stops the follow-up running after receiving instruction or consent from the vehicle driver. For example, when determining that the execution of the follow-up running will be difficult, the follow-up-running control portion 98 informs the vehicle driver by displaying on an in-vehicle monitor or the like that the follow-up running cannot be continued. The follow-up-running control portion 98 determines whether the driver has instructed or consented to stop the follow-up running, for example, depending one driver's operations made on the in-vehicle monitor or the like. When determining that the vehicle driver has instructed or consented to stop the follow-up running, the follow-up-running control portion 98 stops the follow-up running and terminates the follow-up running.

Figure 12:
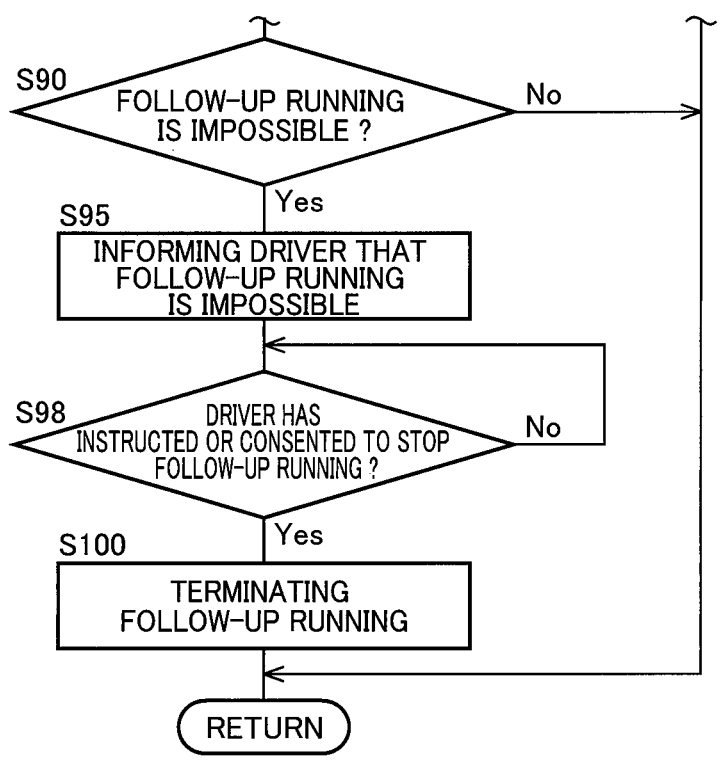
FIG. 12 is a flow chart showing of a control routine to be executed by the electronic control apparatus, so as to appropriately maintain the follow-up running and to suppress the increase of the oil temperature that could be caused by the reduction of the cooling performance of the heat exchanger, wherein this control routine is other than the control routine shown in the flow chart of FIG. 8.

FIG. 12 is a flow chart showing of a control routine to be executed by the electronic control apparatus 90, so as to appropriately maintain the follow-up running and to suppress the increase of the oil temperature THoil that could be caused by the reduction of the cooling performance of the heat exchanger 66. This control routine is executed, for example, in a repeated manner, and is other than the control routine shown in the flow chart of FIG. 8. In the flow chart of FIG. 12, mainly, parts different from those of the control routine shown in the flow chart of FIG. 8 are described.

In the control routine shown in the flow chart of FIG. 12, when an affirmative determination is made at the above-described step S90, step S95 corresponding to function of the follow-up-running control portion 98 is implemented to inform the vehicle driver that the execution of the follow-up running is impossible. Then, step S98 corresponding to function of the follow-up-running control portion 98 is implemented to determine whether the vehicle driver has instructed or consented to stop the follow-up running. When a negative determination is made at step S98, this step S98 is implemented again. When an affirmative determination is made at step S98, the above-described step S100 is implemented.

As described above, in this fourth embodiment, when it is determined that the execution of the follow-up running becomes difficult, the follow-up running is stopped after the instruction or consent is received from the vehicle driver. Thus, it is possible to appropriately shift from the follow-up running in which the vehicle 10 is caused to run automatically, to the running in which the vehicle 10 is caused to run through operations made by the vehicle driver.

Fifth Embodiment

In event of failure of the torque converter 20 (including the LU clutch 36) and/or at least one device involved in control of the torque converter 20, the LU clutch 36 cannot be appropriately controlled whereby there is a risk that the fluid-temperature increase suppressing control CTtho could not be appropriately executed. The at least one device involved in control of the torque converter 20 is the hydraulic control unit 56 and/or the electronic control apparatus 90, for example.

When detecting failure of the torque converter 20 and/or the at least one device involved in control of the torque converter 20, the LU-clutch control portion 96 inhibits the execution of the fluid-temperature increase suppressing control CTtho. Further, when detecting the failure, the LU-clutch control portion 96 may also place the LU clutch 36 into the released state.

Figure 13:
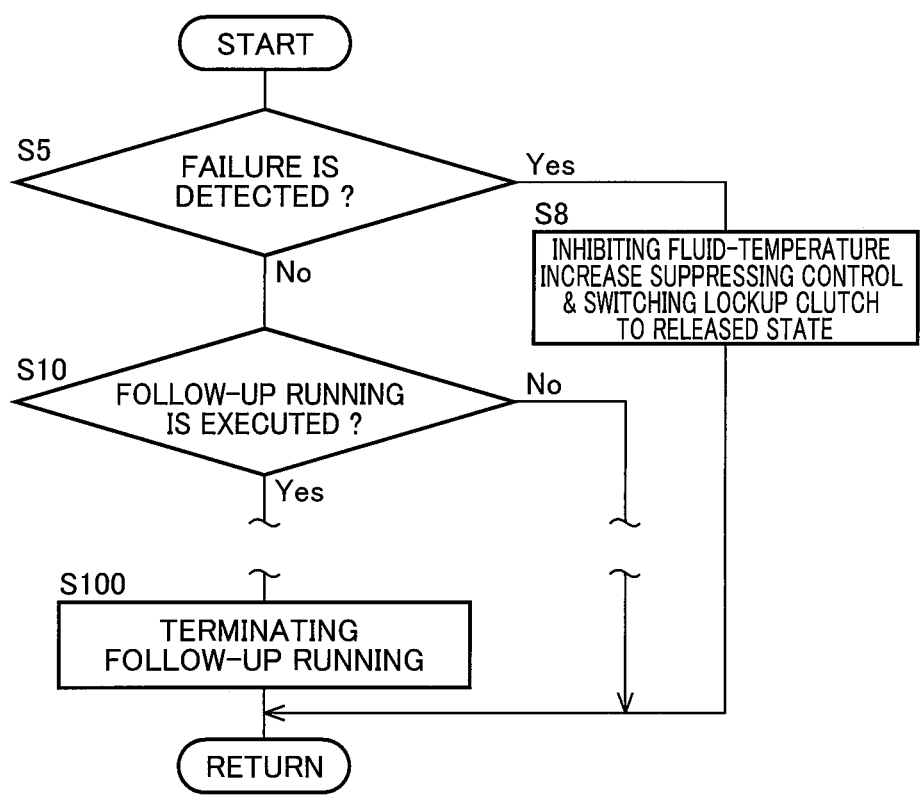
FIG. 13 is a flow chart showing of a control routine to be executed by the electronic control apparatus, so as to appropriately maintain the follow-up running and to suppress the increase of the oil temperature that could be caused by the reduction of the cooling performance of the heat exchanger, wherein this control routine is other than the control routine shown in the flow chart of FIG. 8.

FIG. 13 is a flow chart showing of a control routine to be executed by the electronic control apparatus 90, so as to appropriately maintain the follow-up running and to suppress the increase of the oil temperature THoil that could be caused by the reduction of the cooling performance of the heat exchanger 66. This control routine is executed, for example, in a repeated manner, and is other than the control routine shown in the flow chart of FIG. 8. In the flow chart of FIG. 13, mainly, parts different from those of the control routine shown in the flow chart of FIG. 8 are described.

In the control routine shown in the flow chart of FIG. 13, step S5 corresponding to function of the LU-clutch control portion 96 is implemented to determine whether failure of the torque converter 20 and/or the at least one device involved in control of the torque converter 20 is detected or not. When an affirmative determination is made at step S5, step S8 corresponding to function of the LU-clutch control portion 96 is implemented to inhibit the execution of the fluid-temperature increase suppressing control CTtho and to place the LU clutch 36 into the released state. When a negative determination is made at step S5, the above-described step S10 is implemented.

As described above, in this fifth embodiment, the execution of the fluid-temperature increase suppressing control CTtho is inhibited when the failure of the torque converter 20 and/or at least one device involved in control of the torque converter 20 is detected. Thus, the fluid-temperature increase suppressing control CTtho is not executed when there is a risk that the operation state of the LU clutch 36 could not appropriately switched.

While the preferred embodiments of this invention have been described in detail by reference to the drawings, it is to be understood that the invention may be otherwise embodied.

For example, the above-described first embodiment may be carried out together with the feature or features of at least one of the above-described second through fifth embodiments.

Further, in the above-described embodiments, the fluid-temperature threshold value THf does not have be determined necessarily based on the vehicle area information Iard and the environment information of the expected running route, and may be set to a predetermine value that makes it possible to suppress increase of the oil temperature THoil. Moreover, the fluid-temperature threshold value THf may be determined based on one piece of information from the vehicle area information Iard or one piece of information from the environment information of the expected running route.

Further, in the above-described embodiments, each of the control routines may be modified as needed. For example, steps S90 and S100, which are described in the flow chart of FIG. 8, may be omitted.

Further, in the above-described embodiments, the heat exchanger 66 may be, for example, a radiator-built-in oil cooler to which air is to hit directly.

It is to be understood that the embodiments described above are given for illustrative purpose only, and that the present invention may be embodied with various modifications and improvements which may occur to those skilled in the art.

NOMENCLATURE OF ELEMENTS

10: vehicle
12: engine (power source)
14: drive wheels
20: torque converter (fluid transmission device)
36: LU clutch (lockup clutch)
90: electronic control apparatus (control apparatus)
96: LU-clutch control portion (lockup-clutch control portion)
98: follow-up-running control portion
FLD: oil (working fluid)
MG: rotating machine (power source)
SP: power source

What is claimed is:

1. A control apparatus for a vehicle that is provided with (i) a power source, (ii) drive wheels and (iii) a fluid transmission device which is disposed in a power transmission path between the power source and the drive wheels and which includes a lockup clutch,
the control apparatus comprising:
a follow-up-running control portion configured to control a follow-up running in which the vehicle automatically runs following a preceding vehicle with a predetermined inter-vehicle distance to the preceding vehicle from the vehicle; and
a lockup-clutch control portion configured to control the lockup clutch such that an operation state of the lockup clutch is placed in one of a released state, a slipping state or an engaged state,
wherein the lockup-clutch control portion is configured, during the follow-up running, to execute a fluid-temperature increase suppressing control for controlling the operation state of the lockup clutch in a manner that suppresses increase of a temperature of a working fluid which circulates in the fluid transmission device and which is used to switch the operation state of the lockup clutch,
wherein the lockup-clutch control portion is configured to determine a predetermined fluid temperature value such that a determined value is lower as a temperature of the working fluid is increased more easily,
wherein the lockup-clutch control portion is configured, when determining that the temperature of the working fluid is not lower than the predetermined fluid temperature value, to execute the fluid-temperature increase suppressing control such that an amount of heat generated in the fluid transmission device is reduced,
wherein an easiness of increase of the temperature of the working fluid is changeable depending on an inter-vehicle distance to the preceding vehicle from the vehicle, and
wherein the lockup-clutch control portion is configured to determine the predetermined fluid temperature value such that the determined value is lower as the inter-vehicle distance is shorter.

2. The control apparatus according to claim 1,
wherein the fluid-temperature increase suppressing control is to be executed to switch the operation state of the lockup clutch, which is controlled to be placed in the released state or the slipping state in accordance with a predetermined relationship, to the engaged state.

3. The control apparatus according to claim 1,
wherein the fluid-temperature increase suppressing control is to be executed to switch the operation state of the lockup clutch, which is controlled to be placed in the released state in accordance with a predetermined relationship, to the engaged state, and to switch the operation state of the lockup clutch, which is controlled to be placed in the slipping state in accordance with the predetermined relationship, to the released state.

4. The control apparatus according to claim 1,
wherein an easiness of increase of the temperature of the working fluid is changeable depending on an environment of an expected running route that is expected in a future running of the vehicle, and
wherein the lockup-clutch control portion is configured to determine the predetermined fluid temperature value based on information related to the environment of the expected running route.

5. The control apparatus according to claim 4,
wherein the lockup-clutch control portion is configured to calculate a load applied to the vehicle expected in the future running, based on the information related to the environment of the expected running route, and
wherein the lockup-clutch control portion is configured to determine the predetermined fluid temperature value such that the determined value is lower as the calculated load is higher.

6. The control apparatus according to claim 1,
wherein the lockup-clutch control portion is configured to initiate execution of the fluid-temperature increase suppressing control when determining that the temperature of the working fluid is not lower than the predetermined fluid temperature value, and to terminate the execution of the fluid-temperature increase suppressing control when determining that the temperature of the working fluid is not higher than a control-termination threshold value that is lower than the predetermined fluid temperature value.

7. The control apparatus according to claim 1,
wherein the lockup-clutch control portion is configured to inhibit execution of the fluid-temperature increase suppressing control, when detecting failure of at least one of the fluid transmission device and a device involved in control of the fluid transmission device.

8. A control apparatus for a vehicle that is provided with (i) a power source, (ii) drive wheels and (iii) a fluid transmission device which is disposed in a power transmission path between the power source and the drive wheels and which includes a lockup clutch,
the control apparatus comprising:
a follow-up-running control portion configured to control a follow-up running in which the vehicle automatically runs following a preceding vehicle with a predetermined inter-vehicle distance to the preceding vehicle from the vehicle; and
a lockup-clutch control portion configured to control the lockup clutch such that an operation state of the lockup clutch is placed in one of a released state, a slipping state or an engaged state,
wherein the lockup-clutch control portion is configured, during the follow-up running, to execute a fluid-temperature increase suppressing control for controlling the operation state of the lockup clutch in a manner that suppresses increase of a temperature of a working fluid which circulates in the fluid transmission device and which is used to switch the operation state of the lockup clutch, and
wherein the follow-up-running control portion is configured to stop the follow-up running, when determining that change in a running performance of the vehicle caused by execution of the fluid-temperature increase suppressing control makes it difficult to execute the follow-up running.

9. The control apparatus according to claim 8,
wherein the follow-up-running control portion is configured, when determining that the change makes it difficult to execute the follow-up running, to stop the follow-up running after receiving instruction or consent from a driver of the vehicle.

10. A control apparatus for a vehicle that is provided with (i) a power source, (ii) drive wheels and (iii) a fluid transmission device which is disposed in a power transmission path between the power source and the drive wheels and which includes a lockup clutch,
the control apparatus comprising:
a follow-up-running control portion configured to control a follow-up running in which the vehicle automatically runs following a preceding vehicle with a predetermined inter-vehicle distance to the preceding vehicle from the vehicle; and
a lockup-clutch control portion configured to control the lockup clutch such that an operation state of the lockup clutch is placed in one of a released state, a slipping state or an engaged state,
wherein the lockup-clutch control portion is configured, during the follow-up running, to execute a fluid-temperature increase suppressing control for controlling the operation state of the lockup clutch in a manner that suppresses increase of a temperature of a working fluid which circulates in the fluid transmission device and which is used to switch the operation state of the lockup clutch, and
wherein the lockup-clutch control portion is configured to terminate execution of the fluid-temperature increase suppressing control, when the follow-up running is terminated during the execution of the fluid-temperature increase suppressing control.

\* \* \* \* \*